US012786988B2

(12) United States Patent
Elshafie et al.

(10) Patent No.: US 12,786,988 B2
(45) Date of Patent: Nov. 3, 2026

(54) TECHNIQUES TO FACILITATE RESOURCES SELECTED OVER TIME

(71) Applicant: QUALCOMM Incorporated, San Diego, CA (US)

(72) Inventors: Ahmed Elshafie, San Diego, CA (US); Huilin Xu, Temecula, CA (US); Diana Maamari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 443 days.

(21) Appl. No.: 18/190,933

(22) Filed: Mar. 27, 2023

(65) Prior Publication Data

US 2024/0334421 A1 Oct. 3, 2024

(51) Int. Cl.

*H04W 4/00* (2018.01)
*H04W 72/0457* (2023.01)
*H04W 72/1263* (2023.01)
*H04W 72/232* (2023.01)

(52) U.S. Cl.

CPC ... *H04W 72/1263* (2013.01); *H04W 72/0457* (2023.01); *H04W 72/232* (2023.01)

(58) Field of Classification Search

None
See application file for complete search history.

(56) References Cited

U.S. PATENT DOCUMENTS

2024/0147477 A1* 5/2024 Rao ........................ H04W 72/20
2024/0147478 A1* 5/2024 Babaei .................. H04W 72/21
2024/0276483 A1* 8/2024 Li ......................... H04L 1/0003

FOREIGN PATENT DOCUMENTS

WO WO-2022207719 A1 * 10/2022 .......... H04L 1/0003

* cited by examiner

*Primary Examiner* — Zewdu A Beyen
(74) *Attorney, Agent, or Firm* — Procopio, Cory, Hargreaves & Savitch LLP

(57) ABSTRACT

Apparatus, methods, and computer-readable media for facilitating resource selection over time are disclosed herein. An example method for wireless communication at a UE includes receiving, from a network entity, control information scheduling multiple transmission or reception occasions. The example method also includes receiving at least one of an indication of an adaptable parameter or a condition for an adaptation of the multiple transmission or reception occasions. The example method also includes communicating with the network entity based on the multiple transmission or reception occasions. The example method also includes communicating with the network entity based on the adaptation of the multiple transmission or reception occasions in response to an occurrence of the condition or reception of the indication of the adaptable parameter.

30 Claims, 19 Drawing Sheets

CG/SPS K > ... CG/SPS 3 > CG/SPS 2 > CG/SPS 1

CG/SPS 2 > CG/SPS 1

Z > Y > X 1220 1222 1224

| | |
|---|---|
| Adjustment 1 | Use a second resource configuration |
| Adjustment 2 | Increase RBs by 5% |
| Adjustment 3 | Increase time duration by 5% |
| ... | ... |
| Adjustment K | Increase ... |

TECHNIQUES TO FACILITATE RESOURCES SELECTED OVER TIME

TECHNICAL FIELD

The present disclosure relates generally to communication systems, and more particularly, to wireless communication employing semi-static configured resources.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication. An apparatus may include a user equipment (UE). The example apparatus may receive, from a network entity, control information scheduling multiple transmission or reception occasions. The example apparatus may also receive at least one of an indication of an adaptable parameter or a condition for an adaptation of the multiple transmission or reception occasions. Additionally, the example apparatus may communicate with the network entity based on the multiple transmission or reception occasions. The example apparatus may also communicate with the network entity based on the adaptation of the multiple transmission or reception occasions in response to an occurrence of the condition or reception of the indication of the adaptable parameter.

In another aspect of the disclosure, a method, a computer-readable medium, and an apparatus are provided for wireless communication. An apparatus may include a network entity, such as a base station or a component of a base station. The example apparatus may provide control information scheduling a UE for multiple transmission or reception occasions. The example apparatus may also provide at least one of an indication of an adaptable parameter or a condition for an adaptation of the multiple transmission or reception occasions. Additionally, the example apparatus may communicate with the UE based on the multiple transmission or reception occasions. The example apparatus may also communicate with the UE based on the adaptation of the multiple transmission or reception occasions after an occurrence of the condition or providing the indication of the adaptable parameter to the UE.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
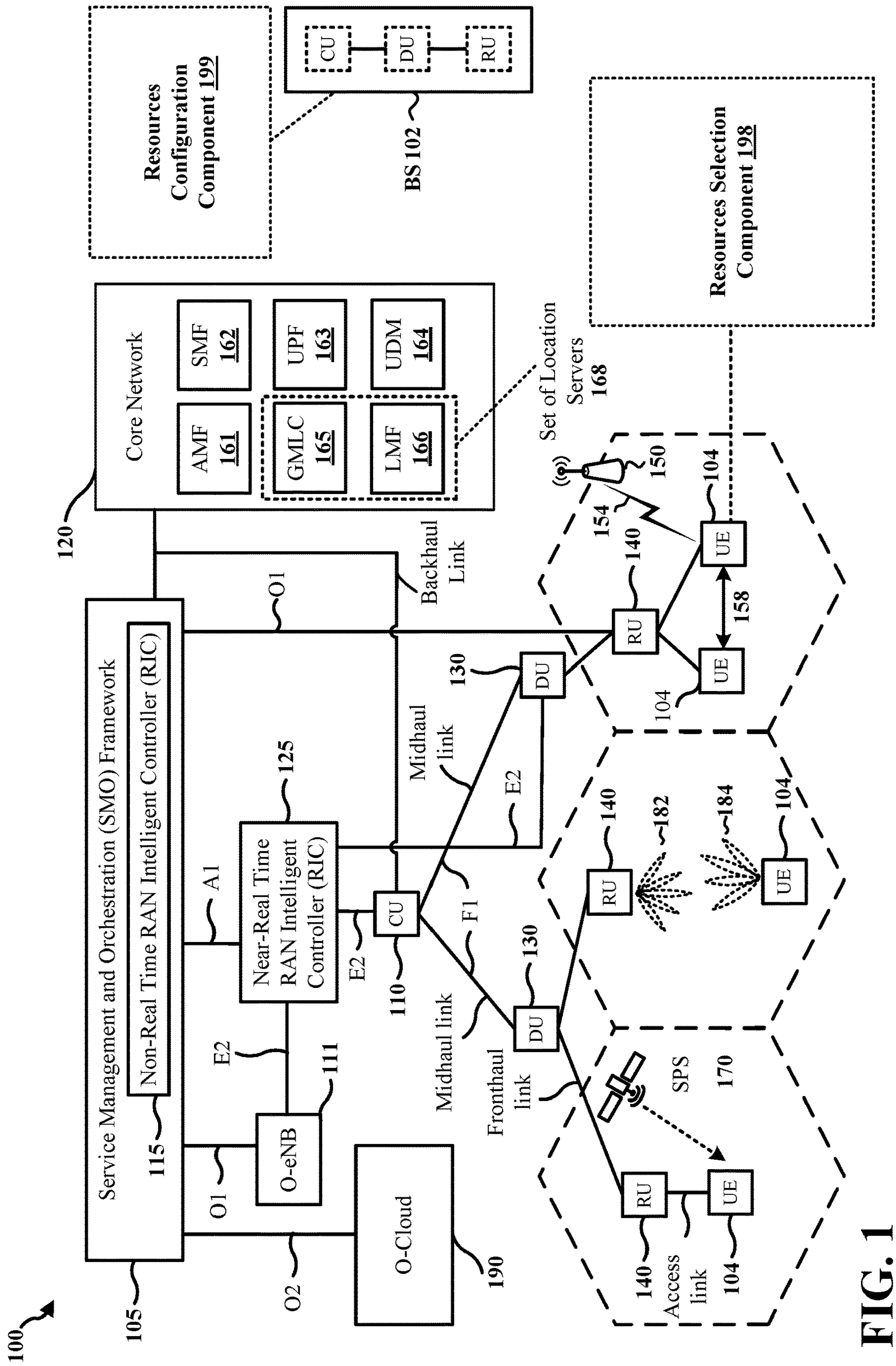
FIG. 1 is a diagram illustrating an example of a wireless communications system and an access network.

Various aspects relate generally to semi-static configured resources. Some aspects more specifically relate to adapting semi-static configured resources, for example, to match experienced conditions.

XR traffic may refer to wireless communications for technologies such as virtual reality (VR), mixed reality (MR), and/or augmented reality (AR). XR traffic may include video data and/or audio data. XR traffic may be transmitted by a network entity and received by a UE or the XR traffic may be transmitted by a UE and received by a network entity. XR traffic may arrive in periodic traffic bursts ("XR traffic bursts"). An XR traffic burst may vary in a number of packets per burst and/or a size of each packet in the burst. Thus, XR traffic bursts may vary in size and include varying amounts of data.

XR traffic may also be associated with a packet delay budget (PDB). If a packet does not arrive within the PDB, a UE (or a network entity) may discard the packet. In an example, if a packet corresponding to a video frame of a video does not arrive at a UE within a PDB, the UE may discard the packet, as the video has advanced beyond the frame. However, the remaining delay (RDB) at the UE may be unaccounted for in consideration of discarding packets. In some aspects, the term "remaining delay" may also be referred to as a "residual delay."

XR traffic may be associated with a limited delay budget. For example, XR traffic may be characterized by relatively high data rates and low latency. The latency in XR traffic may affect the user experience. For instance, XR traffic may have applications in eMBB and URLLC services.

Traffic bursts, such as XR bursts by way of example, are periodic, may include some time jitter in the arrival, and may be associated with variable packet sizes. Semi-static configured resources may be used for transmitting and/or receiving periodic traffic, such as XR traffic. Semi-static configured resources may be associated with a configured grant (CG) for uplink transmissions or a semi-persistent scheduling (SPS) grants for downlink receptions. The SPS or CG scheduling may be configured to accommodate periodic traffic, multiple flows, jitter, latency, and reliability for the wireless traffic and may improve capacity and/or latency for such wireless communication. However, the resources may be fixed allocations, which may result in an over-allocation or an under-allocation of resources for a respective transmission or reception.

Aspects disclosed herein provide techniques for adapting resources (e.g., semi-statically configured resources, such as resources associated with a CG or an SPS grant) based on one or more conditions experienced with the transmission or reception of data, such as XR traffic. For example, aspects disclosed herein provide techniques for adapting one or more parameters of a transmission or reception occasion over time to match the experienced conditions. Thus, as time progresses, the resources available for transmission or reception of data may adjust, for example, to account for a shortened time (e.g., a smaller remaining delay budget). In some examples, adapting the one or more parameters may include increasing an amount of resources associated with a transmission or reception occasion, for example, by increasing a resource block allocation (e.g., in the frequency domain) or time duration allocation (e.g., in the time domain) for the transmission or reception occasion.

In some aspects disclosed herein, the UE may apply the change in resources based on one or more conditions or thresholds being satisfied or met. For example, when a threshold is satisfied, the UE may increase the amount of resources for a transmission or reception occasion. Examples of a condition include time-based thresholds and occasion-based thresholds.

In some aspects disclosed herein, the UE may apply the change in resources based on receiving a configurable parameter. The configurable parameter may indicate a parameter of a CG configuration or an SPS configuration for the UE to adapt. For example, a network entity may provide a configurable parameter that indicates a change in one or more of a different frequency allocation for the multiple transmission or reception occasions, a different time duration allocation for the multiple transmission or reception occasions, a different periodicity for the multiple transmission or reception occasions, or a different starting time for the multiple transmission or reception occasions.

Particular aspects of the subject matter described in this disclosure can be implemented to realize one or more of the following potential advantages. Resources adaptability provides greater flexibility in the resources used for transmission or reception occasions, particularly in increasing capacity to match experienced conditions. Conditions that may be experienced include varying latency, varying traffic size, varying reliability, etc. By adapting the resources, variations in size of traffic may be matched to provide improved resource utilization. More specifically, aspects disclosed herein allocate a baseline resource for a configured grant or a semi-persistent scheduling reference signal. The baseline resource may represent a smallest resource size and changes may occur to the baseline resource over time. By increasing resources used for a transmission or reception occasion, aspects of the present disclose may achieve capacity enhancements, for example, to match varying traffic size.

Although the following description provides examples directed to 5G NR (and, in particular, to semi-static configured resources), the concepts described herein may be applicable to other similar areas, such as 6G, 5G-advanced, LTE, LTE-A, CDMA, GSM, and/or other wireless technologies, in which a UE may use the semi-static configured resources for transmission and/or reception occasions.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs (e.g., a CU 110) that can communicate directly with a core network 120 via a backhaul link, or indirectly with the core network 120 through one or more disaggregated base station units (such as a Near-Real Time (Near-RT) RAN Intelligent Controller (RIC) (e.g., a Near-RT RIC 125) via an E2 link, or a Non-Real Time (Non-RT) RIC (e.g., a Non-RT RIC 115) associated with a Service Management and Orchestration (SMO) Framework (e.g., an SMO Framework 105), or both). A CU 110 may communicate with one or more DUs (e.g., a DU 130) via respective midhaul links, such as an F1 interface. The DU 130 may communicate with one or more RUs (e.g., an RU 140) via respective fronthaul links. The RU 140 may communicate with respective UEs (e.g., a UE 104) via one or more radio frequency (RF) access links. In some implementations, the UE 104 may be simultaneously served by multiple RUs.

Each of the units, i.e., the CUS (e.g., a CU 110), the DUs (e.g., a DU 130), the RUs (e.g., an RU 140), as well as the Near-RT RICs (e.g., the Near-RT RIC 125), the Non-RT RICs (e.g., the Non-RT RIC 115), and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU 140 can be implemented to handle over the air (OTA) communication with one or more UEs (e.g., the UE 104). In some implementations, real-time and non-real-time aspects of control and user plane communication with the RU 140 can be controlled by a corresponding DU. In some scenarios, this configuration can enable the DU(s) and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs, DUs, RUS and Near-RT RICs. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs via an O1 interface.

The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs, one or more DUs, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs (e.g., the RU 140) and the UEs (e.g., the UE 104) may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UE 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs may communicate with each other using device-to-device (D2D) communication (e.g., a D2D communication link 158). The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with a UE 104 (also referred to as Wi-Fi stations (STAs)) via communication link 154, e.g., in a 5 GHz unlicensed frequency spectrum or the like. When communicating in an unlicensed frequency spectrum, the UE 104/Wi-Fi AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) (e.g., an AMF 161), a Session Management Function (SMF) (e.g., an SMF 162), a User Plane Function (UPF) (e.g., a UPF 163), a Unified Data Management (UDM) (e.g., a UDM 164), one or more location servers 168, and other functional entities. The AMF 161 is the control node that processes the signaling between the UE 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) (e.g., a GMLC 165) and a Location Management Function (LMF) (e.g., an LMF 166). However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, a device in communication with a network entity, such as a UE 104 in communication with a base station 102 or a component of a base station (e.g., a CU 110, a DU 130, and/or an RU 140), may be configured to manage one or more aspects of wireless communication. For example, the UE 104 may have a resources selection component 198 that may be configured to facilitate increasing resources for semi-static configured resources over time.

In certain aspects, the resources selection component 198 may be configured to receive, from a network entity, control information scheduling multiple transmission or reception occasions. The example resources selection component 198 may also be configured to receive at least one of an indication of an adaptable parameter or a condition for an adaptation of the multiple transmission or reception occasions. Additionally, the example resources selection component 198 may be configured to communicate with the network entity based on the multiple transmission or reception occasions. The example resources selection component 198 may also be configured to communicate with the network entity based on the adaptation of the multiple transmission or reception occasions in response to an occurrence of the condition or reception of the indication of the adaptable parameter.

In another configuration, a network entity, such as a base station 102 or a component of a base station (e.g., a CU 110, a DU 130, and/or an RU 140), may be configured to manage or more aspects of wireless communication. For example, the base station 102 may have a resources configuration component 199 that may be configured to facilitate communicate with a UE based on increasing resources for semi-static configured resources over time.

In certain aspects, the resources configuration component 199 may be configured to provide control information scheduling a UE for multiple transmission or reception occasions. The example resources configuration component 199 may also be configured to provide at least one of an indication of an adaptable parameter or a condition for an adaptation of the multiple transmission or reception occasions. Additionally, the example resources configuration component 199 may be configured to communicate with the UE based on the multiple transmission or reception occasions. The example resources configuration component 199 may also be configured to communicate with the UE based on the adaptation of the multiple transmission or reception occasions after an occurrence of the condition or providing the indication of the adaptable parameter to the UE.

Aspects disclosed herein facilitate increasing resources, such as multiple transmission or reception occasions, over time, for example, as the remaining packet delay time decreases. The increase in the resources may be based on at least one of a condition and an adaptable parameter.

Figure 2B:
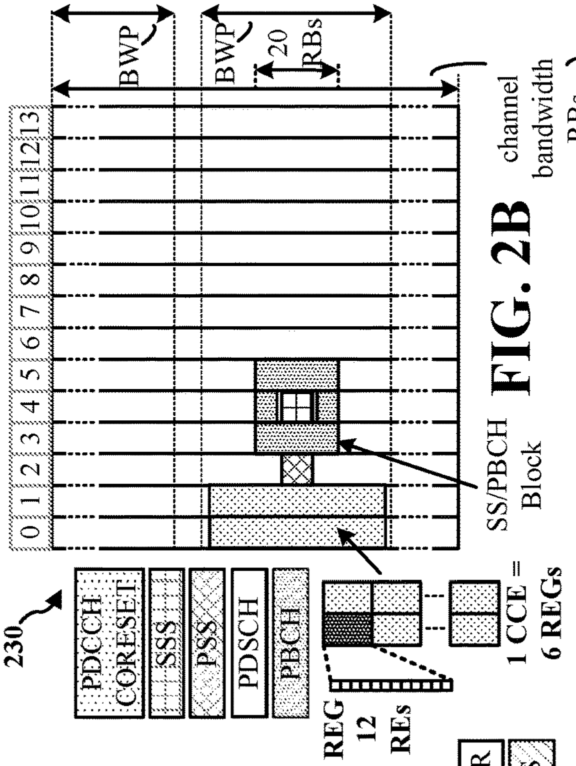
FIG. 2B is a diagram illustrating an example of downlink (DL) channels within a subframe, in accordance with various aspects of the present disclosure.
Figure 2A:
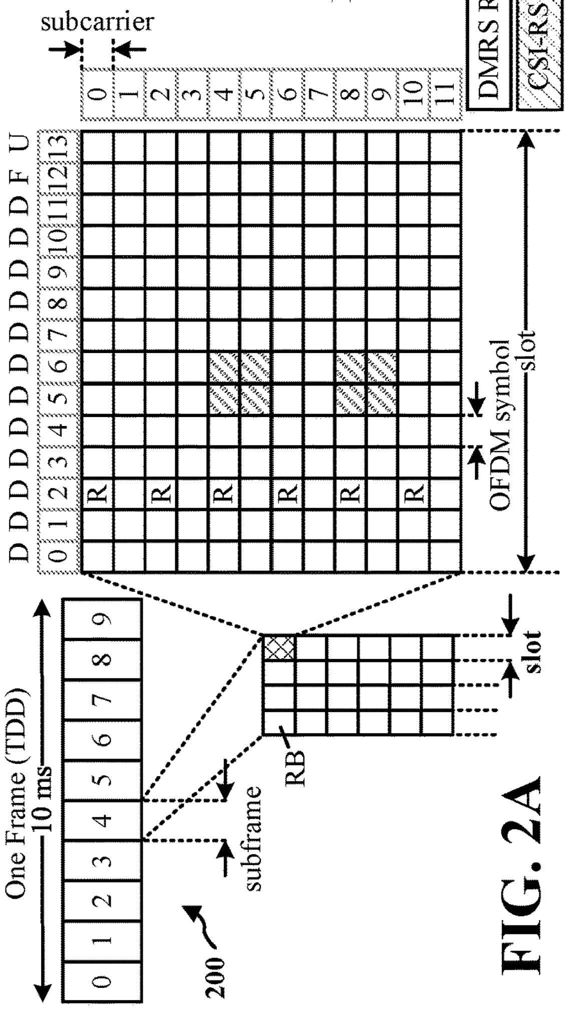
FIG. 2A is a diagram illustrating an example of a first frame, in accordance with various aspects of the present disclosure.
Figure 2D:
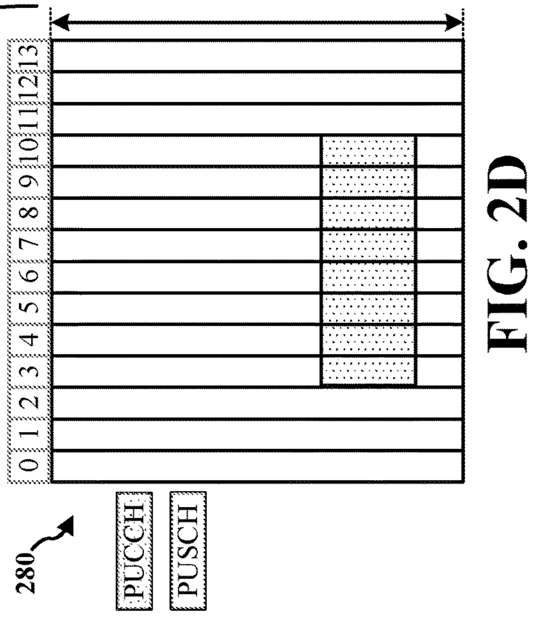
FIG. 2D is a diagram illustrating an example of uplink (UL) channels within a subframe, in accordance with various aspects of the present disclosure.
Figure 2C:
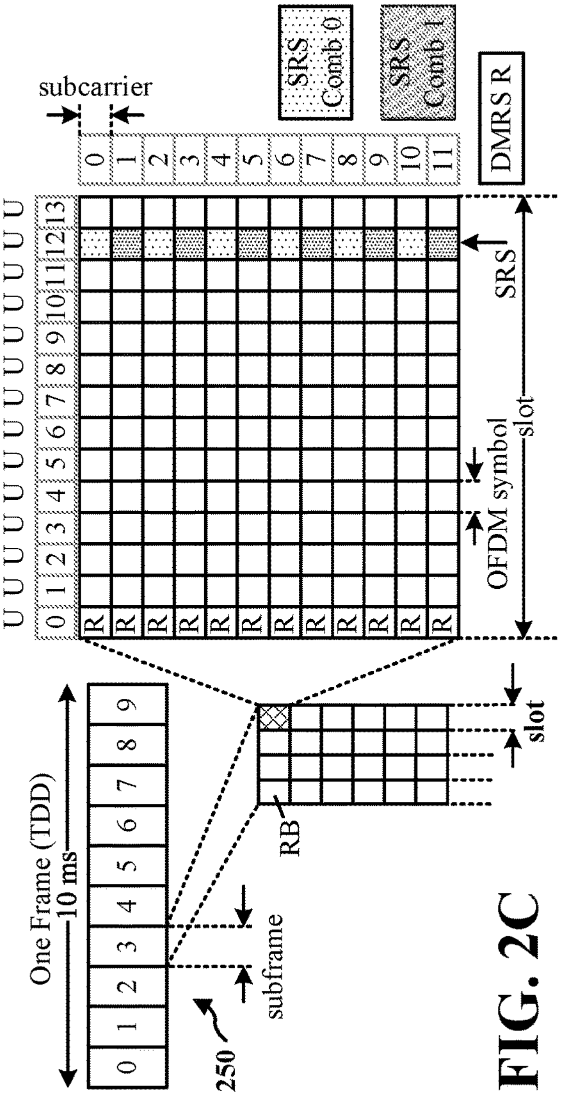
FIG. 2C is a diagram illustrating an example of a second frame, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. As shown in Table 1, the subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
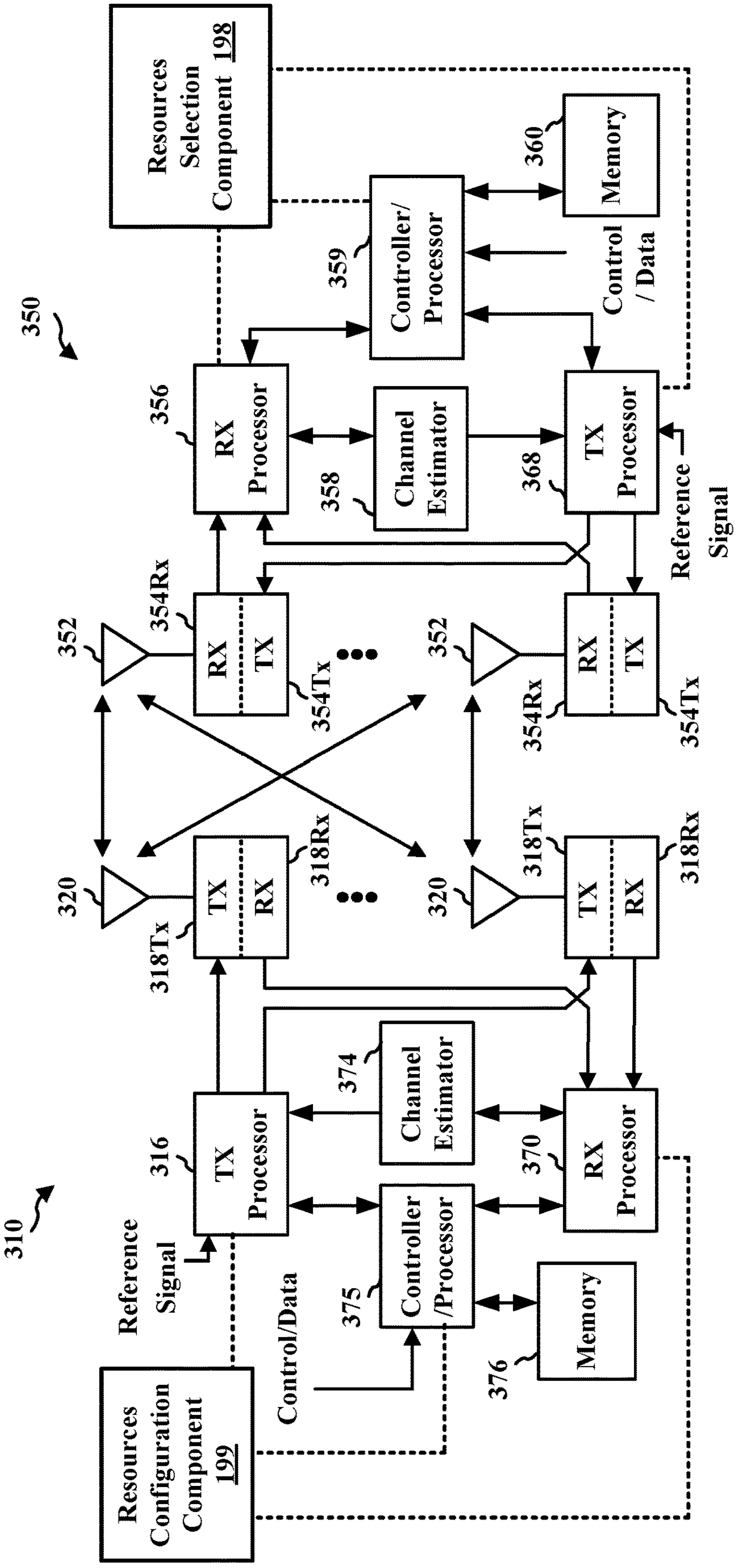
FIG. 3 is a diagram illustrating an example of a base station and user equipment (UE) in an access network.

FIG. 3 is a block diagram that illustrates an example of a first wireless device that is configured to exchange wireless communication with a second wireless device. In the illustrated example of FIG. 3, the first wireless device may include a base station 310, the second wireless device may include a UE 350, and the base station 310 may be in communication with the UE 350 in an access network. As shown in FIG. 3, the base station 310 includes a transmit processor (TX processor 316), a transmitter 318Tx, a receiver 318Rx, antennas 320, a receive processor (RX processor 370), a channel estimator 374, a controller/processor 375, and memory 376. The example UE 350 includes antennas 352, a transmitter 354Tx, a receiver 354Rx, an RX processor 356, a channel estimator 358, a controller/processor 359, memory 360, and a TX processor 368. In other examples, the base station 310 and/or the UE 350 may include additional or alternative components.

In the DL, Internet protocol (IP) packets may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna of the antennas 320 via a separate transmitter (e.g., the transmitter 318Tx). Each transmitter 318Tx may modulate a radio frequency (RF) carrier with a respective spatial stream for transmission.

At the UE 350, each receiver 354Rx receives a signal through its respective antenna of the antennas 352. Each receiver 354Rx recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, two or more of the multiple spatial streams may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna of the antennas 352 via separate transmitters (e.g., the transmitter 354Tx). Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna of the antennas 320. Each receiver 318Rx recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the resources selection component 198 of FIG. 1.

At least one of the TX processor 316, the RX processor 370, and the controller/processor 375 may be configured to perform aspects in connection with the resources configuration component 199 of FIG. 1.

XR traffic may refer to wireless communications for technologies such as VR, MR, and/or AR. VR may refer to technologies in which a user is immersed in a simulated experience that is similar or different from the real world. A user may interact with a VR system through a VR headset or a multi-projected environment that generates realistic images, sounds, and other sensations that simulate a user's physical presence in a virtual environment. MR may refer to technologies in which aspects of a virtual environment and a real environment are mixed. AR may refer to technologies in which objects residing in the real world are enhanced via computer-generated perceptual information, sometimes across multiple sensory modalities, such as visual, auditory, haptic, somatosensory, and/or olfactory. An AR system may incorporate a combination of real and virtual worlds, real-time interaction, and accurate three-dimensional registration of virtual objects and real objects. In an example, an AR system may overlay sensory information (e.g., images) onto a natural environment and/or mask real objects from the natural environment. XR traffic may include video data and/or audio data. XR traffic may be transmitted by a network entity and received by a UE or the XR traffic may be transmitted by a UE and received by a network entity.

Figure 4:
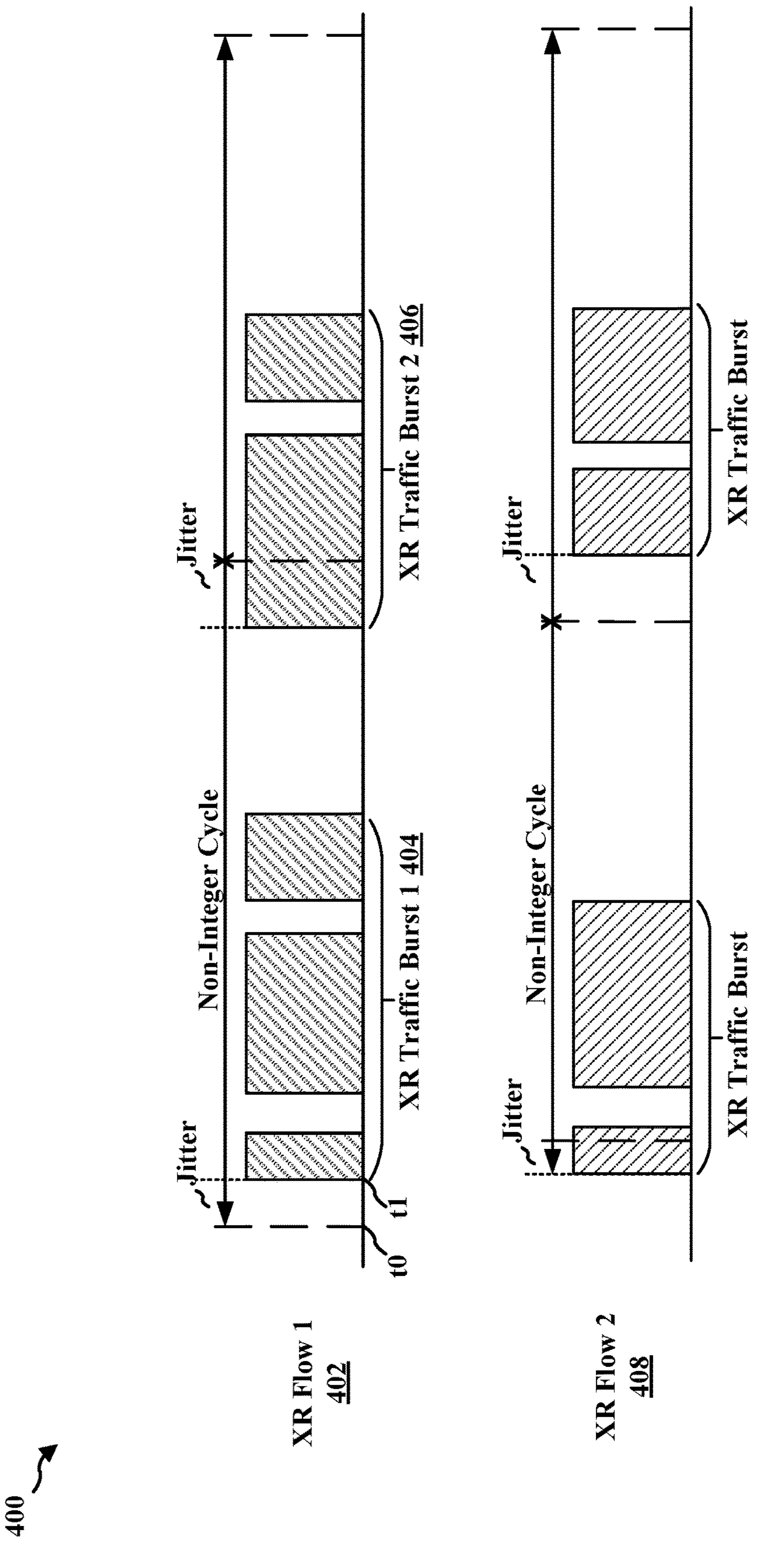
FIG. 4 is a diagram illustrating example extended reality (XR) traffic, in accordance with various aspects of the present disclosure.

FIG. 4 is a diagram 400 illustrating example XR traffic, as presented herein. XR traffic may arrive in periodic traffic bursts. An XR traffic burst may vary in a number of packets per burst and/or a size of each packet in the burst. The diagram 400 illustrates a first XR flow 402 that includes a first XR traffic burst 404 and a second XR traffic burst 406. As illustrated in the diagram 400, the traffic bursts may include different numbers of packets, e.g., the first XR traffic burst 404 being shown with three packets (represented as rectangles in the diagram 400) and the second XR traffic burst 406 being shown with two packets. Furthermore, as illustrated in the diagram 400, the three packets in the first XR traffic burst 404 and the two packets in the second XR traffic burst 406 may vary in size. For example, packets within the first XR traffic burst 404 and the second XR traffic burst 406 may include varying amounts of data.

XR traffic bursts may arrive at non-integer periods (e.g., in a non-integer cycle). The periods may be different than an integer number of symbols, slots, etc. In an example, for 60 frames per second (FPS) video data, XR traffic bursts may arrive in $1/60=16.67$ ms periods. In another example, for 120 FPS video data, XR traffic bursts may arrive in $1/120=8.33$ ms periods.

Arrival times of XR traffic may vary. For example, XR traffic bursts may arrive (e.g., from an application) and be available for transmission at a time that is earlier or later than a time at which a UE (or a network entity) expects the XR traffic bursts. The variability of the packet arrival relative to the period (e.g., 16.76 ms period, 8.33 ms period, etc.) may be referred to as "jitter." In an example, jitter for XR traffic may range from −4 ms (earlier than expected arrival) to +4 ms (later than expected arrival). For instance, referring to the first XR flow 402, a UE may expect a first packet of the first XR traffic burst 404 to arrive at time t0, but the first packet of the first XR traffic burst 404 arrives at time t1.

XR traffic may include multiple flows that arrive at a UE (or a network entity) concurrently with one another (or within a threshold period of time). For instance, the diagram 400 includes a second XR flow 408. The second XR flow 408 may have different characteristics than the first XR flow 402. For instance, the second XR flow 408 may have XR traffic bursts with different numbers of packets, different sizes of packets, etc. In an example, the first XR flow 402 may include video data and the second XR flow 408 may include audio data for the video data. In another example, the first XR flow 402 may include intra-coded picture frames (I-frames) that include complete images and the second XR flow 408 may include predicted picture frames (P-frames) that include changes from a previous image.

As noted herein, XR traffic may have an associated PDB, which may sometimes be referred to as an "end-to-end (e2e) packet delay budget" (e2e PDB). If a packet does not arrive within the PDB, a UE (or a network entity) may discard the packet. In an example, if a packet corresponding to a video frame of a video does not arrive at a UE within a PDB, the UE may discard the packet, as the video has advanced beyond the frame. However, the remaining delay (RDB) at the UE may be unaccounted for in consideration of discarding packets.

Figure 5:
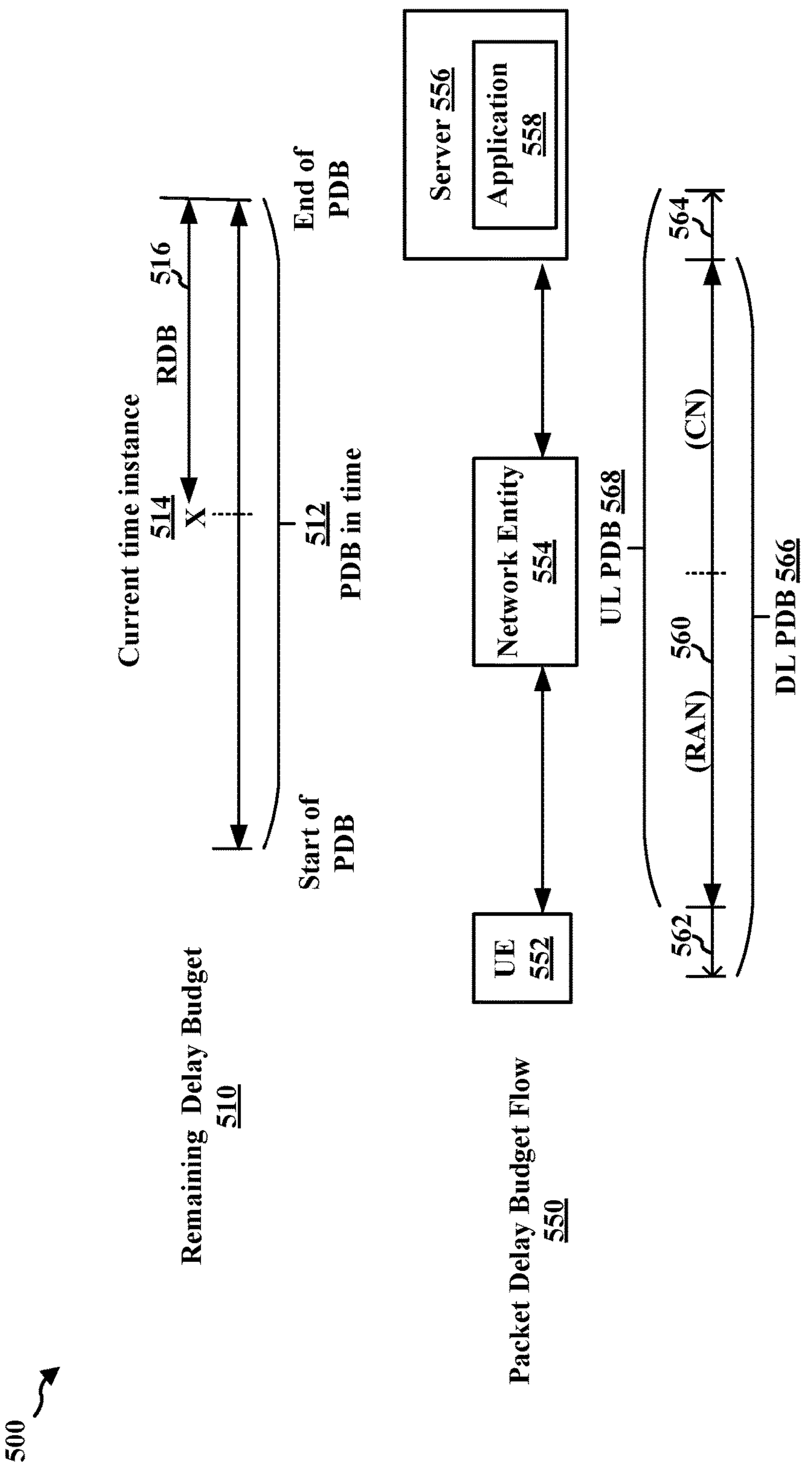
FIG. 5 is a diagram illustrating example delay budgets, in accordance with various aspects of the present disclosure.

FIG. 5 is a diagram 500 illustrating example delay budgets, as presented herein. An example time diagram 510 shows a length of time corresponding to a PDB 512. At a particular point in time 514, a remaining delay budget 516 is the remaining portion of the PDB 512.

An XR traffic overall PDB may include a portion to allow for communication delay of data (e2e PDB) between a UE and a computing device (e.g., a server) hosting an application (e.g., for XR), and a portion for additional time after the communication delay before the data is discarded, e.g., a remaining delay (e.g., RDB). For instance, the diagram 500 includes a packet delay budget flow 550. As shown in FIG. 5, the packet delay budget flow 550 illustrates a UE 552, a network entity 554, and a server 556 that hosts an application 558. In the illustrated aspect, a communication delay 560 is shown as including a RAN portion between the UE 552 and the network entity 554, as well as a core network (CN) portion between the network entity 554 and the server 556. The communication delay 560 may apply to both UL and DL communications. Additionally, a remaining delay 562 is shown at the UE 552 for DL communications and a remaining delay 564 is shown at the server 556 for UL communications. The communication delay 560 and the remaining delay 562 may make up an overall PDB for DL XR communications (e.g., a DL PDB 566). Likewise, the communication delay 560 and the remaining delay 564 may make up an overall PDB for UL XR communications (e.g., an UL PDB 568).

In general, XR traffic may be characterized by relatively high data rates and low latency. The latency in XR traffic may affect the user experience. For instance, XR traffic may have applications in eMBB and URLLC services.

Figure 6:
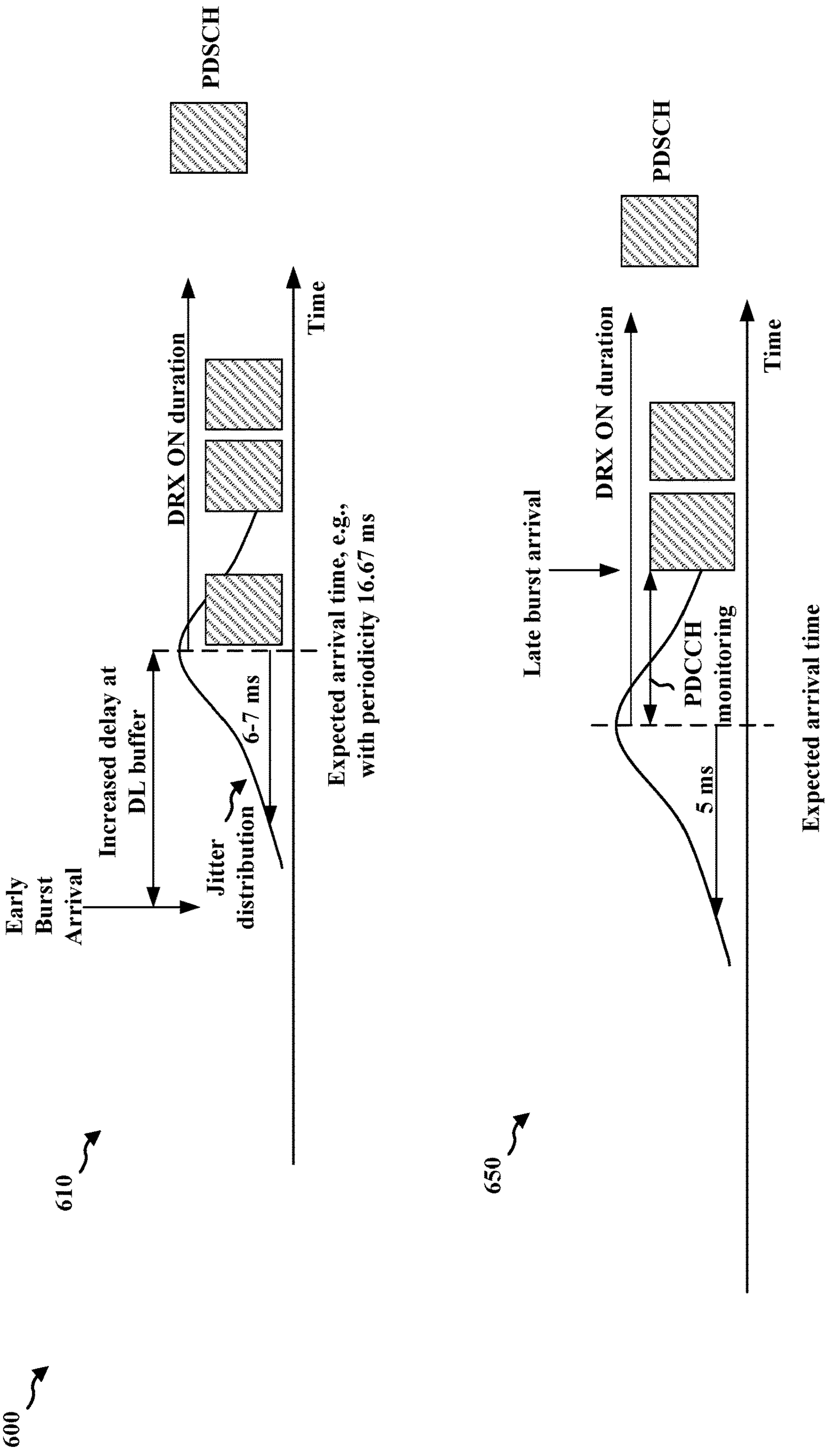
FIG. 6 is a diagram illustrating examples of early burst arrival and late burst arrival, in accordance with various aspects of the present disclosure.

In some aspects, parts of XR communications may include video frame transmission. In some such aspects, video frames may periodically arrive, for example, at a network entity. The arrival time may be subject to random jitter. In some aspects, the jitter may follow a truncated Gaussian distribution with zero mean, 2 ms standard deviation, and a range of [−4, 4] ms. FIG. 6 is a diagram 600 illustrating examples of early burst arrival and late burst arrival, as presented herein. An example first time diagram 610 shows the impact to a PDB when an XR traffic burst arrives early. For example, the early traffic experiences an increased buffer delay. An example second time diagram 650 shows the impact to a PDB when an XR traffic burst arrives late. For example, if PDSCH traffic has a late arrival, there is a period of time during the DRX ON duration when a UE would perform PDCCH monitoring but not receive PDSCH. Although the example is illustrated for PDSCH, aspects similarly apply for uplink communication, e.g., PUCCH and/or PUSCH.

The XR communication may also have variable frame sizes, which may also follow a truncated Gaussian distribution. In an example, AR/VR traffic communicated at 30 Mbps (Megabits per second) may have a minimum packet size of 31250 bytes, a maximum packet size of 93750 bytes, and a mean packet size of 62500 bytes. In some such examples, for a bandwidth of 100 MHz with an SCS of 30 kHz, an amplitude modulation of 16 QAM, and a ⅓ code rate, the XR traffic may be 5 slots, 10 slots, and 15 slots.

Additionally, XR traffic (e.g., XR video frames) may be associated with a limited delay budget. In an example, for AR/VR traffic, the delay budget for XR video frames may be 10 ms from the time that the XR video frames arrive at the network entity (e.g., from an XR application) to the time it is successfully transferred to a UE. Referring to the example of FIG. 5 and the packet delay budget flow 550, the communication delay 560 may be 10 ms.

Thus, in view of jitter and variable frame sizes associated with XR traffic, certain types of dynamic signaling may be used, for example, to indicate the data arrival time, to indicate the number of slots associated with PDSCH, etc. In an example, dynamic signaling may include wake-up signals (WUS) that may be associated with a discontinuous reception (DRX) mode. In another example, dynamic signaling may include scheduling control information, such as scheduling DCI. Additionally, for XR traffic, such as XR video data transmissions, multi-PxSCH scheduling control information may be suitable. For example, a single DCI may schedule multiple PUSCH transmission occasions at a UE or schedule multiple PDSCH reception occasions at the UE. In some aspects, the scheduling of multi-PxSCH may be performed in the 52.6 GHz to 71 GHz range.

Various aspects may be employed to provide power saving and/or capacity improvements for wireless communication, e.g., including XR traffic. Scheduling mechanisms such as a semi-persistent scheduling (SPS) grant or a configured grant (CG) may be used to provide periodic resources for UL communication or DL communication that may be used without a dynamic grant of resources. A configured grant provides a UE with periodic or semi-persistent resources that the UE may use for uplink transmissions, e.g., PUSCH, to the network. An SPS grant may provide the UE with periodic or semi-persistent resources for receiving downlink transmissions, e.g., PDSCH, from the network. For example, the network may provide one or more configured grants of recurring resources for uplink transmission or SPS resources for downlink reception in RRC signaling to the UE. For some types of configured grants, the UE may use the allocated resources based on the RRC configuration and without activation or control signaling from the network (e.g., a type 1 CG). In other types of configured grants, the UE may further receive an indication that the configured grant is activated or enabled for the UE to use, e.g., in a MAC-CE or DCI (e.g., a type 2 CG). The UE may then use the recurring resources of the configured grant for uplink transmissions, e.g., until the UE receives signaling from the network that the configured grant is deactivated. In some aspects, the UE may receive RRC signaling configuring multiple configured grants for the UE, and the UE may then receive a MAC-CE that activates one or more of the configured grants from the RRC signaling. The configured grant provides the UE with an allocation of resources that the UE can use for uplink transmissions without individual grants, e.g., in DCI, for individual uplink transmissions. Similarly, the SPS grant provides the UE with an allocation of resources that the UE can use for downlink reception without individual grants, e.g., in DCI. The configured grant or SPS grant can reduce the overhead for signaling grants to the UE and can reduce latency for the UE to transmit uplink transmissions or receive downlink transmissions.

Some types of wireless communication systems may employ dynamic grants for scheduling purposes to accommodate traffic (e.g., XR traffic). In a dynamic grant, a scheduler, e.g., such as a network entity, may use control signaling to allocate resources for transmission or reception at a UE (e.g., a grant of UL resources or DL resources). Dynamic grants may be flexible and can adopt to variations in traffic behavior.

For wireless communication that is based on a dynamic grant, the UE may monitor for a PDCCH including a DCI that schedules the UE, e.g., allocates particular resources to the UE, to transmit or receive communication with a network entity. For example, the DCI may indicate instructions to receive data over a PDSCH. In some aspects, such as when a UE has data to transmit, the UE may transmit a scheduling request to a network entity to trigger the network entity to allocate resources for the transmission, such as in DCI. Various aspects also provide a UE to request for a dynamic grant (DG) of a resource for UL communication.

A configured grant or SPS grant scheduling may provide periodic or semi-static resources, for example, that a UE can use to transmit or receive communication without receiving individual grants. For example, a UE may receive a configured grant in an RRC configuration configuring multiple transmission occasions. The UE may then use the granted resources for transmitting PUSCH transmission without additional DCI. In another example, a UE may receive an SPS grant configuring multiple reception occasions. The UE may then monitor the configured resources for receiving PDSCH without additional DCI scheduling the respective reception occasions. In some aspects, the UE may receive a MAC-CE activating a previously configured CG and/or a previously configured SPS grant.

The SPS grant or CG scheduling may be configured to accommodate the periodic traffic, multiple flows, jitter, latency, and reliability for the wireless traffic and may improve capacity and/or latency for such wireless communication. Traffic bursts, such as XR bursts by way of example, are periodic, may include some time jitter in the arrival, and may be associated with variable packet sizes.

Semi-static configured resources, such as resources allocated via SPS grant scheduling or CG scheduling, are helpful in reducing latency associated with periodic traffic. For example, instead of requesting resources for an uplink communication each time a UE has uplink traffic to communicate, the UE may be granted semi-static configured resources to use with the periodic traffic. However, semi-static configured resources may also be associated with a fixed allocation. In some examples, the allocated resources may not match the transport block size. For example, a network granting the allocated resources may over-allocate resources or may under-allocate resources with respect to a transport block size.

As discussed previously, semi-static configured resources may be allocated via configured grants and/or semi-persistent scheduling grants. As used herein, a configured grant may allocate semi-static configured resources at a UE for uplink communication (e.g., may schedule multiple PUSCH transmission occasions). As used herein, a semi-persistent scheduling grant may allocate semi-static resources at a UE for downlink communication (e.g., may schedule multiple PDSCH reception occasions). However, in other examples, a configured grant or a semi-persistent scheduling grant may allocate semi-static configured resources at a UE for uplink communication and/or downlink communication.

A configured grant includes a type 1 CG and a type 2 CG. A type 2 CG may have characteristics similar to an SPS grant. A type 1 CG is configured and activated via RRC signaling. For example, the RRC signaling may provide the time/frequency resource allocation, the periodicity, a starting time, etc. associated with the semi-static configured resources for multiple transmission or reception occasions. The semi-static configured resources associated with the type 1 CG may be used once configured and may continue to be used until they are deactivated. Similar to the type 1 CG, a type 2 CG or SPS grant is configured via RRC signaling. The semi-static configured resources associated with the type 2 CG (or SPS grant) may be used once activated. That is, after being configured with a type 2 CG or an SPS, a UE waits to use the respective semi-static configured resources until the UE receives an activation, such as an activation DCI.

Figure 7:
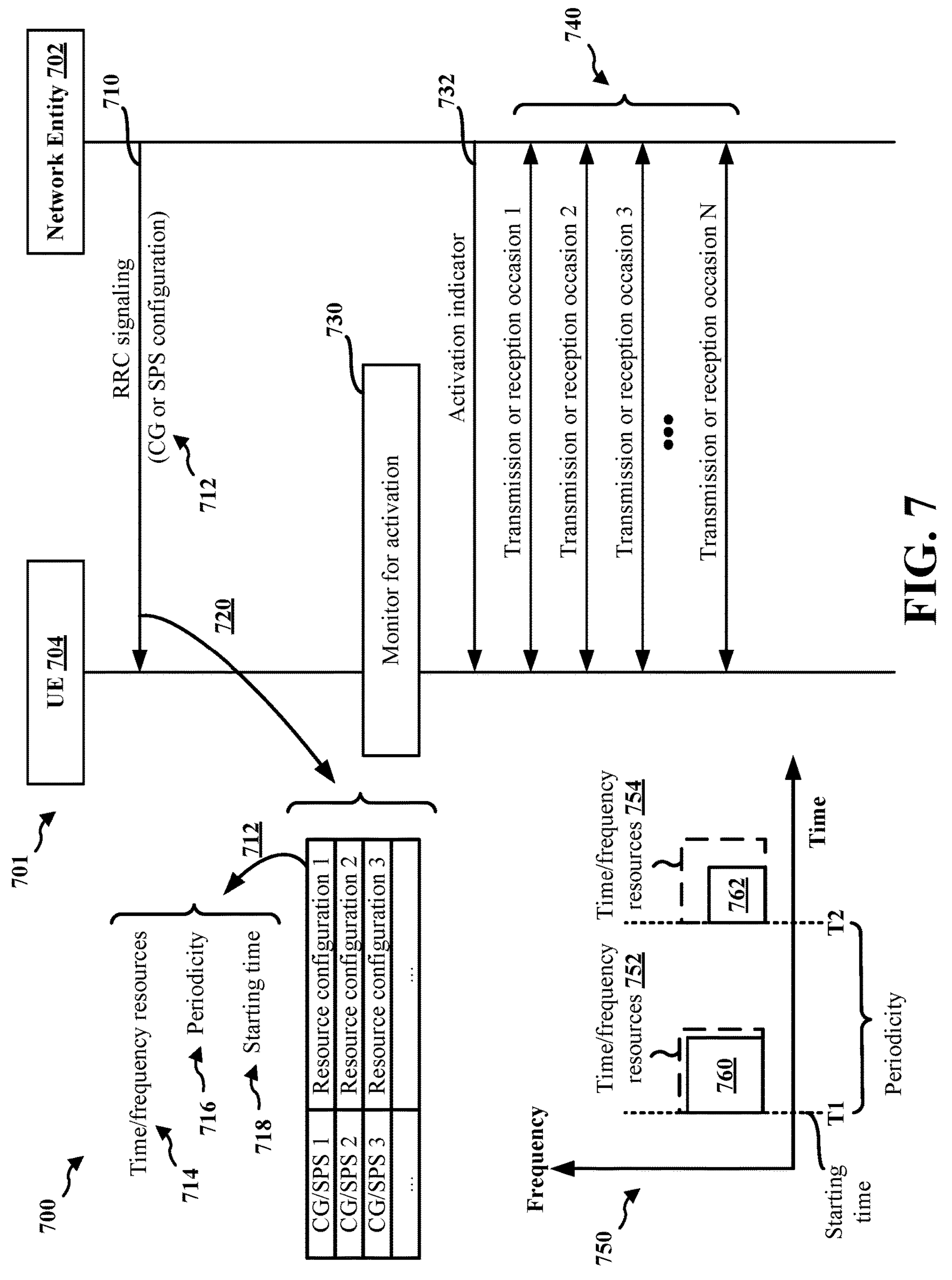
FIG. 7 is a diagram illustrating different mechanisms for allocating semi-static configured resources, in accordance with various aspects of the present disclosure.

FIG. 7 is a diagram 700 illustrating different mechanisms for allocating semi-static configured resources, as presented herein. For example, the diagram 700 includes a communication flow 701 between a network entity 702 and a UE 704. In some examples, one or more aspects described for the network entity 702 may be performed by a base station or a component of a base station, such as a CU, a DU, and/or an RU.

As shown in the communication flow 701, the network entity 702 may provide (e.g., output, transmit, etc.) RRC signaling 710 that is received by the UE 704. The RRC signaling 710 may include an RRC setup message (which may be referred to as an "RRCSetup" message or any other name) and/or an RRC reconfiguration message (which may be referred to as an "RRCReconfiguration" message or any other name). The RRC signaling 710 may configure a first resource configuration 712. In some examples, the first resource configuration 712 may configure type 1 CG resources for uplink (e.g., PUSCH) transmissions at the UE 704. In some examples, the first resource configuration 712 may configure type 2 CG resources for uplink (e.g., PUSCH) transmissions at the UE 704. In some examples, the first resource configuration 712 may configure SPS resources for downlink (e.g., PDSCH) receptions at the UE 704.

The first resource configuration 712 may schedule multiple transmission or reception occasions 740 that are associated with one or more parameters, such as time/frequency resources, a periodicity, a starting time, a repetition factor, a modulation and coding scheme (MCS), etc. As shown in the example of FIG. 7, the first resource configuration 712 may configure time/frequency resources 714, a periodicity 716, and a starting time 718. The time/frequency resources 714 may indicate an allocation of frequency domain resources (e.g., one or more subcarriers) and an allocation of time domain resources (e.g., one or more slots, symbols, etc.). The periodicity 716 may indicate a time duration between transmission or reception occasions. The starting time 718 may indicate an offset in the time domain for a first transmission or reception occasion.

For example, the diagram 700 includes a representation 750 of the one or more parameters of the first resource configuration 712. As shown in the representation 750, the first resource configuration 712 may schedule a first transmission or reception occasion at a time T1 and a second transmission or reception occasion at a time T2. The time duration between the time T1 and the time T2 may be based on the periodicity 716. The location of the first transmission or reception occasion at the time T1 may be based on the starting time 718. For example, the time T1 may correspond to an offset in the time domain from when the first resource configuration 712 is activated. Additionally, as shown in the representation 750, the transmission or reception occasions are associated with an allocation of time/frequency resources (e.g., first time/frequency resources 752 at the time T1 and second time/frequency resources 754 at the time T2), such as the time/frequency resources 714.

Returning to the communication flow 701, the first resource configuration 712 may schedule the multiple transmission or reception occasions 740. For example, the first resource configuration 712 may schedule a first transmission or reception occasion, a second transmission or reception occasion, a third transmission or reception occasion, and continuing until an Nth transmission or reception occasion. In some examples, a transmission or reception occasion may be associated with new data, which may sometimes be referred to as an "initial transmission" or a "new transmission." In some examples, a transmission or reception occasion may be associated with a repetition (or a retransmission) of previously communicated data. For example, the first transmission or reception occasion may be used to communicate first data, the second transmission or reception occasion may be used to communicate second data, and the third transmission or reception occasion may be used to communicate third data. In some such examples, the first data and the second data may each comprise new data, and the third data may comprise a repetition (or a retransmission) of the second data.

As shown in FIG. 7, before using the first resource configuration 712 at the multiple transmission or reception occasions 740, the network entity 702 may provide an activation indicator 732 that is received by the UE 704. The activation indicator 732 may activate a CG or SPS configuration, such as the first resource configuration 712. Once activated, the UE 704 may start using the semi-static resources associated with the first resource configuration 712 at the multiple transmission or reception occasions 740.

As described above, the first resource configuration 712 may configure a CG configuration (e.g., for PUSCH transmissions) or an SPS configuration (e.g., for PDSCH receptions). In a first mechanism, the RRC signaling 710 may configure type 1 CG resources for PUSCH transmissions at the UE 704. For example, the RRC signaling 710 may configure and activate the first resource configuration 712 associated with multiple transmission occasions (e.g., the multiple transmission or reception occasions 740). For example, the UE 704 may start using the first resource configuration 712 without receiving a separate activation message. That is, with respect to the first mechanism, the RRC signaling 710 may provide the first resource configuration 712 and the activation indicator 732.

In a second mechanism, the RRC signaling 710 may configure type 2 CG resources for PUSCH transmissions or SPS resources for PDSCH receptions. For example, the RRC signaling 710 may configure the first resource configuration 712 associated with the multiple transmission or reception occasions 740. The UE 704 may then perform a monitoring procedure 730 to monitor for signaling to activate the first resource configuration 712. For example, the network entity 702 may provide the activation indicator 732 that is received by the UE 704. The activation indicator 732 may activate the first resource configuration 712. The network entity 702 may provide the activation indicator 732 via a medium access control-control element (MAC-CE) or DCI (e.g., an activation DCI or a reactivation DCI). After the UE 704 receives the activation indicator 732, the UE 704 may then start transmitting PUSCH transmissions or monitoring for PDSCH receptions at the multiple transmission or reception occasions 740. That is, after being configured with the first resource configuration 712 (e.g., via the RRC signaling 710), the UE 704 may wait to receive the activation indicator 732 before using the first resource configuration 712.

In some examples, the RRC signaling 710 may configure multiple CG or SPS configurations. For example, the RRC signaling 710 may configure multiple resource configurations 720. In the example of FIG. 7, the multiple resource configurations 720 include the first resource configuration 712, a second resource configuration, and so forth. The activation indicator 732 may then activate one or more resource configurations of the multiple resource configurations 720.

As shown in the example of FIG. 7, a single activation may activate the multiple transmission or reception occasions 740. In the example of FIG. 7, the parameters associated with a CG or SPS configuration (e.g., the first resource configuration 712) may be fixed across the multiple transmission or reception occasions 740. For example, and with respect to the representation 750, the allocation of time/frequency resources 752 for the transmission or reception occasion at the time T1 and the allocation of time/frequency resources 754 for the transmission or reception at the time T2 may be a same size (e.g., may occupy a same number of frequency domain resources and a same number of time domain resources).

However, such resource allocations may not account for variable traffic sizes and/or transmissions with different transport block sizes, such as XR traffic. For example, and with respect to the representation 750, the UE 704 may have a first transport block 760 to transmit at the time T1 and a second transport block 762 to transmit at the time T2. The first transport block 760 and the second transport block 762 may be associated with variable sizes. For example, the size of the first transport block 760 may be different than the size of the second transport block 762. In the illustrated example of FIG. 7, the first transport block 760 is larger than the second transport block 762. For example, the first transport block 760 may occupy more frequency domain resources and/or time domain resources than the second transport block 762.

In some examples, the size of a transport block may be similar (e.g., the same or nearly the same) to the size of the time/frequency resources 714. For example, the size of the first transport block 760 is similar to the allocation of the time/frequency resources 752. In other examples, the size of the time/frequency resources 714 may be an over-allocation of resources (e.g., which may result in wasted or unused resources), or may be an under-allocation of resources (e.g., which may result in an unsuccessful transmission of the transport block). For example, the size of the second transport block 762 is smaller than the size of the time/frequency resources 754, which may result in unused resources.

Aspects disclosed herein provide techniques for adapting resources (e.g., semi-statically configured resources, such as resources associated with a CG or an SPS grant) based on one or more conditions experienced with the transmission of data, such as XR traffic. For example, aspects disclosed herein provide techniques for adapting one or more parameters of a transmission or reception occasion over time to match the experienced conditions. Thus, as time progresses, the resources available for transmission or reception of data may adjust, for example, to account for a shortened time (e.g., a smaller remaining delay budget). In some examples, adapting the one or more parameters may include increasing an amount of resources associated with a transmission or reception occasion, for example, by increasing a resource block allocation (e.g., in the frequency domain) or time duration allocation (e.g., in the time domain) for the transmission or reception occasion. In some examples, adapting the one or more parameters, as disclosed herein, may facilitate reducing a block error rate (BLER) or a block error ratio associated with a transmission (e.g., a PUSCH transmission) or reception (e.g., a PDSCH reception) of data. In some examples, a UCI-aided CG or a DCI-aided SPS grant may facilitate adjusting a CG configuration or an SPS configuration (e.g., adjusting the one or more parameters). In some such examples, the UCI or DCI may indicate an actual number of PUSCHs or PDSCHs with individual data on the respective occasion.

In some aspects disclosed herein, the UE may apply the change in resources based on one or more conditions or thresholds being satisfied or met. For example, when a threshold is satisfied, the UE may increase the amount of resources for a transmission or reception occasion. In an example, a condition may be associated with a latency threshold. In some such examples, if the UE determines it has a small (or "tight") latency budget scenario (e.g., a first time threshold is satisfied), the UE may use 10% more resources for the next transmission or reception occasion. Examples of a condition include one or more of a time threshold, a delay parameter threshold, a threshold number of PUSCH transmission occasions, and/or a threshold number of PDSCH reception occasions.

In some aspects disclosed herein, a network entity may indicate a baseline size for a CG configuration or an SPS configuration. For example, the network entity may indicate a number of RBs in the frequency domain for the baseline size. The network entity may also indicate a starting symbol (or slot) and a size of time domain resources (e.g., a duration). In some aspects, the baseline size may correspond to a smallest amount of resources that a UE may select for a transmission or reception occasion. In some such examples, the UE may then adapt one or more parameters associated with the baseline size over time.

The term "baseline size" may also be referred to as a "baseline resource," a "baseline allocation," or an "initial size."

Figure 8:
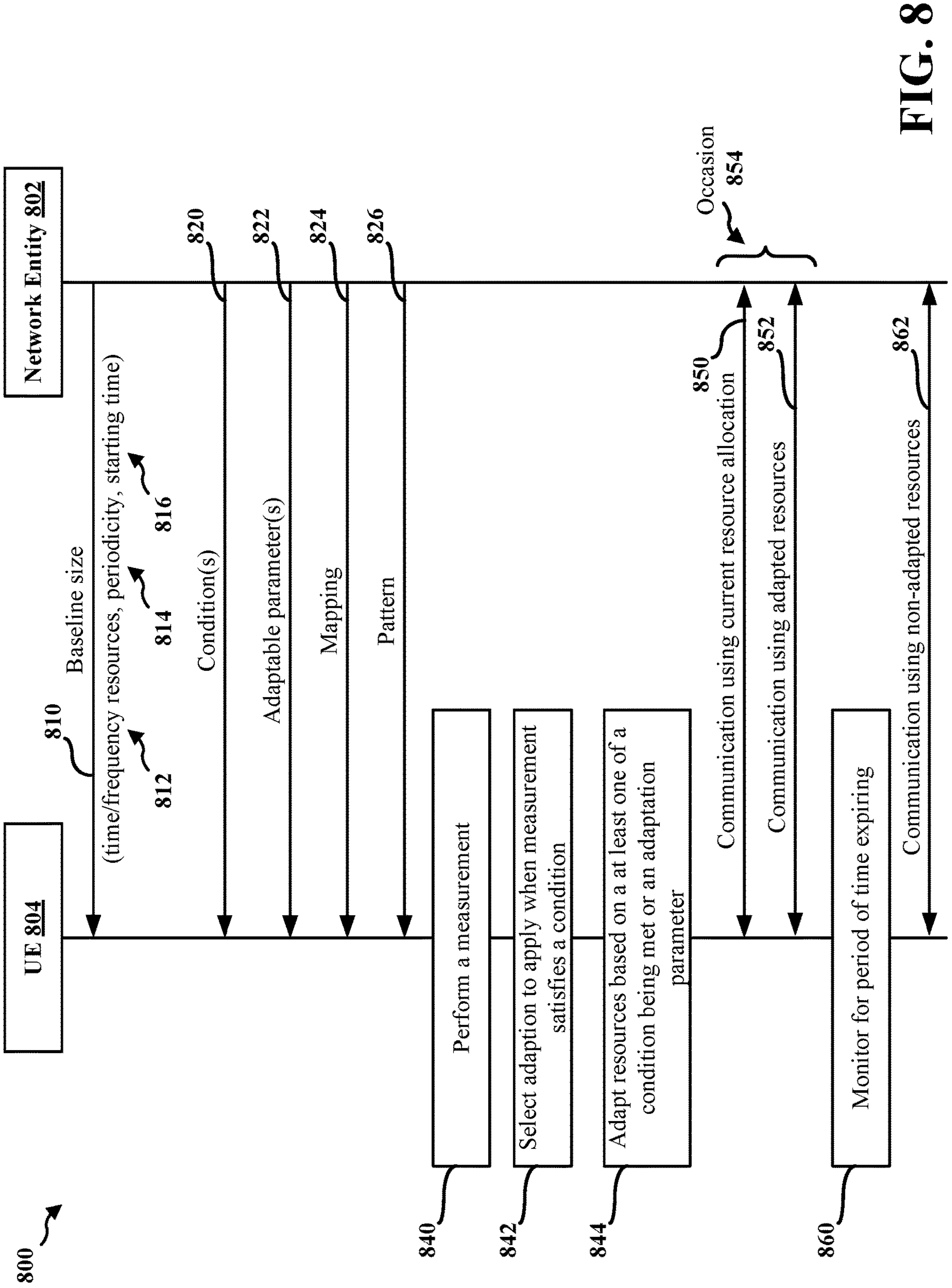
FIG. 8 illustrates an example communication flow between a network entity and a UE, in accordance with various aspects of the present disclosure.

FIG. 8 illustrates an example communication flow 800 between a network entity 802 and a UE 804, as presented herein. One or more aspects described for the network entity 802 may be performed by a component of a base station or a network entity, such as a CU, a DU, and/or an RU. In the illustrated example, the communication flow 800 facilitates improving communication performance by increasing resources for semi-static configured resources over time Aspects of the network entity 802 may be implemented by the base station 102 of FIG. 1 and/or the base station 310 of FIG. 3. Aspects of the UE 804 may be implemented by the UE 104 of FIG. 1 and/or the UE 350 of FIG. 3. Although not shown in the illustrated example of FIG. 8, in other examples, the network entity 802 and/or the UE 804 may be in communication with one or more other base stations or UEs.

While FIG. 7 illustrates examples of configuring semi-static resources with a fixed resource allocation, the examples of FIG. 8 illustrate configuring semi-static resources that are adaptable, for example, over time and based on experienced conditions. For example, based on an occurrence of a condition or an indication of an adaptable parameter, the UE 804 may adapt a baseline size of the semi-static resources to accommodate the experiences conditions. It may be appreciated that some aspects of FIG. 8 may be similar to the examples of FIG. 7. Additionally, some aspects of configuring semi-static resources are not included in FIG. 8, but shown in FIG. 7, to improve readability of the figure.

As shown in FIG. 8, the network entity 802 may provide baseline size information 810 that is received by the UE 804. The network entity 802 may provide the baseline size information 810 via control signaling, such as RRC signaling, a MAC-CE, and/or DCI. The baseline size information 810 may include one or more parameters associated with a CG or an SPS grant. In some aspects, the baseline size information 810 may be similar to the first resource configuration 712 of FIG. 7. For example, the baseline size information 810 may include information related to time/frequency resources, periodicity, and/or a starting time for semi-static configured resources. In the illustrated example of FIG. 8, the baseline size information 810 includes indicators for time/frequency resources 812, periodicity 814, and a starting time 816. However, other examples may include additional or alternate parameters, such as MCS, repetition factors, etc.

As disclosed herein, the UE 804 may adapt resources for a transmission or reception occasion, for example, to account for the conditions experienced at a previous transmission or reception occasion. In some examples, the UE 804 may adapt the resources based on one or more conditions being met. For example, the network entity 802 may provide a condition 820 that is received by the UE 804. The network entity 802 may provide the condition 820 via control signaling, such as RRC signaling, a MAC-CE, and/or DCI.

In some examples, the condition 820 may be based on an identifier, such as a resource ID (e.g., an identifier of a resource configuration), a UE ID (e.g., an identifier of the UE 804), and/or a cell ID (e.g., an identifier of a cell served by the network entity 802). In another example, the condition 820 may additionally or alternatively indicate a threshold, such as a time-based threshold or an occasion-based threshold. In another example, the condition 820 may additionally or alternatively be based on energy conditions at the network entity 802 and/or the UE 804, such as a power saving mode, an energy availability, an energy state, and/or a power/energy charging and/or discharging rate the UE 804. In another example, the condition 820 may additionally or alternatively be based on a retransmission or a repetition factor. In another example, the condition 820 may additionally or alternatively be based on the data being communicated, such as an L1 priority of the data, an L2 priority of the data, and/or a quality of service (QoS) for the data.

In some examples, the condition 820 may include a threshold that is based on a time unit (e.g. a time-based threshold). For example, the threshold may include a time threshold or a delay parameter threshold that indicates an amount of time elapsed, an amount of time remaining, etc. For example, the UE 804 may perform a measurement procedure 840 to measure a remaining time budget associated with a transmission or reception occasion, as described in connection with the remaining delay budget 516 of FIG. 5. The UE 804 may then determine whether the measured remaining time budget satisfies a time-based threshold (e.g., the time threshold or the delay parameter threshold). For example, the UE 804 may compare the measured remaining time budget to the time-based threshold and determine if the condition 820 is satisfied or not satisfied.

In some examples, the condition 820 may include a threshold that is based on a number of occasions (e.g., an occasion-based threshold). For example, the threshold may include a threshold number of PUSCH transmission occasions or a threshold number of PDSCH reception occasions. In some such examples, the UE 804 may perform the measurement procedure 840 to determine a current occasion count. The UE 804 may then determine whether the determined occasion count satisfies an occasion-based threshold (e.g., the threshold number of PUSCH transmission occasions or the threshold number of PDSCH reception occasions). For example, the UE 804 may compare the determined occasion count to the occasion-based threshold and determine if the condition 820 is satisfied or not satisfied.

In some aspects, the network entity 802 may indicate an adaptation of the one or more parameters. For example, the network entity 802 may provide an indication of an adaptable parameter 822 that is received by the UE 804. The indication of the adaptable parameter 822 may indicate a change in a frequency allocation, a change in a time duration allocation, a change in periodicity, and/or a change in a starting time. In some examples, the indication of the adaptable parameter 822 may indicate the change as a percentage (e.g., a percentage increase of resources from a previous transmission or reception occasion). The network entity 802 may provide the indication of the adaptable parameter 822 via control signaling, such as RRC signaling, a MAC-CE, and/or DCI.

In some examples, the indication of the adaptable parameter 822 may indicate a change from a first CG or SPS configuration to a second CG or SPS configuration. For example, FIG. 9A is a diagram illustrating an example table 900 including multiple CG configurations or SPS configurations, as presented herein. As shown in FIG. 9A, indices 902 map to corresponding resource configurations 904. In some such examples, the UE 804 may switch between resource configurations based on an index.

In some examples, a single resource configuration may include different values of one or more of a same parameter. For example, FIG. 9B is a diagram illustrating an example table 920 including a single resource configuration with different parameter values, as presented herein. As shown in FIG. 9B, a first column 922 of the table 920 indicates a resource configuration, such as the corresponding resource configurations 904 of FIG. 9A. A second column 924 indicates a parameter and its value. In the illustrated example of FIG. 9B, a first resource configuration ("Resource configuration 1") is associated with at least three different values for a first parameter ("Parameter 1"), such as RBs. For example, in a first scenario, the value of the first parameter is "X," in a second scenario, the value of the first parameter is "Y," and in a third scenario, the value of the first parameter is "Z." As shown in FIG. 9B, the value of "Z" is greater than the value of "Y," which is greater than the value of "X."

In the illustrated example of FIG. 9B, a third column 926 indicates a condition associated with a respective value of the first parameter. For example, when a first condition is met, the UE 804 may set the value of the first parameter to "X." In a similar manner, the UE 804 may set the value of the first parameter to "Y" when the second condition is met, and the UE 804 may set the value of the first parameter to "Z" when the third condition is met.

Referring again to the example of FIG. 8, in some examples, the UE 804 may determine to perform the adaptation of the one or more parameters when the measurement satisfies the threshold (e.g., the time-based threshold and/or the occasion-based threshold). For example, the UE 804 may perform a selection procedure 842 to select the adaptation to apply and/or the resources to use, for example, when a condition is met. The UE 804 may select the adaptation to apply based on one or more configuring parameters, based on an indication, based on a procedure, based on a rule, based on a function, based on a table, etc. In some examples, the selection procedure 842 may be pre-configured at the UE, for example, according to a technical specification. In some examples, the selection procedure 842 may include one or more inputs. For example, the one or more inputs may be based on the condition 820. The one or more inputs may include a first resource ID, a delay parameter (e.g., a remaining PDB) associated with data, thresholds provided via control information, a CG or SPS configuration (e.g., a resource configuration of the table 900), a resource ID, a UE ID, a cell ID, energy conditions at the UE 804 and/or the network entity 802, a retransmission or a repetition factor, an L1 priority of data, an L2 priority of data, and/or a quality of service (QoS) for the data.

In some examples, the UE 804 may determine to perform an adaptation procedure 844 or to skip performing the adaptation procedure 844 based on a measurement and the selection procedure 842. For example, the UE 804 may determine to perform the adaptation procedure 844 to adapt resources for a transmission or reception occasion when the measurement satisfies the condition 820. Otherwise, the UE 804 may determine to skip performing the adaptation procedure 844 when the measurement fails to satisfy the condition 820.

In some examples, the UE 804 may determine to perform the adaptation procedure 844 when the measured remaining time budget is less than time-based threshold. For example, as the measured remaining time budget decreases, the UE 804 may apply adaptations to increase the size of the resource used for the transmission or reception occasion. In another example, the UE 804 may determine to perform the adaptation procedure 844 when the determined occasion count is greater than or equal to the time-based threshold. For example, as the determined occasion count increases and the number of subsequent occasion opportunities decreases, the UE 804 may apply adaptations to increase the size of the resource used for the transmission or reception occasion.

In some examples, the UE 804 may perform the adaptations (e.g., the adaptation procedure 844) by switching between resource configurations. For example, after determining to adapt the resources, the UE 804 may switch from a first resource configuration to a second resource configuration. In some such examples, when compared to the first resource configuration, the second resource configuration may include more RBs, a higher MCS, a lower periodicity, a higher repetition factor, etc. For example, and referring to the example table 900 of FIG. 9A, a first index (e.g., "CG/SPS 1") may correspond to a first resource configuration (e.g., "Resource configuration 1"), a second index (e.g., "CG/SPS 2") may correspond to a second resource configuration (e.g., "Resource configuration 2"), a third index (e.g., "CG/SPS 3") may correspond to a third resource configuration (e.g., "Resource configuration 3"), and so forth. Additionally, the resources associated with the different CG configurations may be different. For example, resources associated with the first resource configuration may correspond to a baseline size, resources associated with the second resource configuration may be larger than the first resource configuration (e.g., is associated with more RBs, a higher MCS, a lower periodicity, a higher repetition factor, etc.), etc. Additionally, the third resource configuration may be larger than the second resource configuration.

In some examples, the network entity 802 may provide a mapping 824 between a resource configuration and a condition being met. The mapping 824 may include multiple resource configurations, as described in connection with the table 900 of FIG. 9A. The network entity 802 may provide the different resource configurations via a codepoint, a resource identifier (ID), and/or a codepoint that indicates a resource ID or a sequence of resource IDs. The network entity 802 may also provide one or more conditions 906 that, when met, result in an adaptation to the resources. For example, the network entity 802 may provide for the UE 804 to switch from the first resource configuration to the second resource configuration when a first condition is met. The network entity 802 may provide the mapping 824 via control signaling, such as RRC signaling, a MAC-CE, and/or DCI.

In some examples, the network entity 802 may provide a pattern 826 (or sequence) of resources to be used at different occasions of a set of transmission or reception occasions. The set of transmission or reception occasions may correspond to a period of occasions. In some examples, the set of transmission or reception occasions may include multiple resource configurations, such as the example table 900 of FIG. 9A. As an example, the set of transmission or reception occasions may include K occasions and the set of transmission or reception occasions may include K resource configurations. In some such examples, a first transmission or reception occasion may be associated with a first resource (e.g., via a first resource ID). In some examples, the resource ID for the next transmission or reception occasion may be provided by control signaling, such as via RRC signaling, a MAC-CE, and/or DCI. In some examples, the UE 804 may be configured (or pre-configured) with a technique to determine the next resource ID. Examples of such techniques are described in connection with a selection procedure 842 of FIG. 8. The network entity 802 may provide the pattern 826 via control signaling, such as RRC signaling, a MAC-CE, and/or DCI.

Figure 9C:
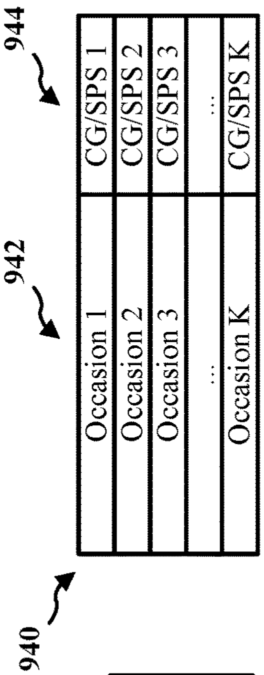
FIG. 9C is a diagram illustrating a first pattern (or sequence) of resources, in accordance with various aspects of the present disclosure.

FIG. 9C is a diagram illustrating a first pattern 940 (or sequence) of resources, as presented herein. In the illustrated example of FIG. 9C, the first pattern 940 includes K resources and K occasions. For example, a first column 942 of the first pattern 940 indicates an occasion (e.g., a transmission or reception occasion) at which a corresponding resource is applied. A second column 944 of the first pattern 940 indicates a resource index, such as the indices 902 of FIG. 9A, mapping to the corresponding resource and occasion. For example, for occasion 1 of the first pattern 940, a UE may apply a first resource that is indicated by the CG/SPS 1, for occasion 2, the UE may apply a second resource that is indicated by the CG/SPS 2, for occasion 3, the UE may apply a third resource that is indicated by the CG/SPS 3, and so forth. As shown in FIG. 9C, as the number of a resource index increases, the size of the resource also increases. For example, the resource indicated by the CG/SPS 2 may be larger than the resource indicated by the CG/SPS 1 in at least one of a time domain and a frequency domain. In other examples, the larger resource may include a higher MCS, a lower periodicity, a higher repetition factor, etc.

Figure 9D:
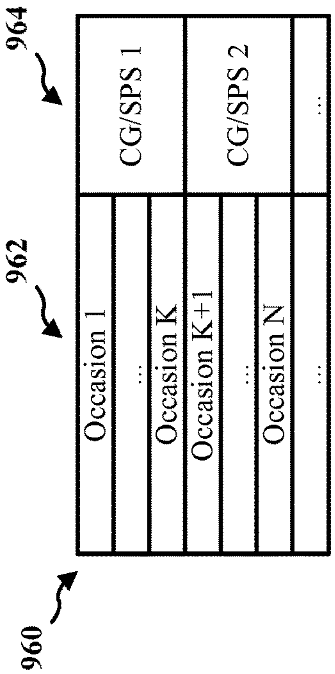
FIG. 9D is a diagram illustrating a second pattern of resources, in accordance with various aspects of the present disclosure.
Figure 9A:
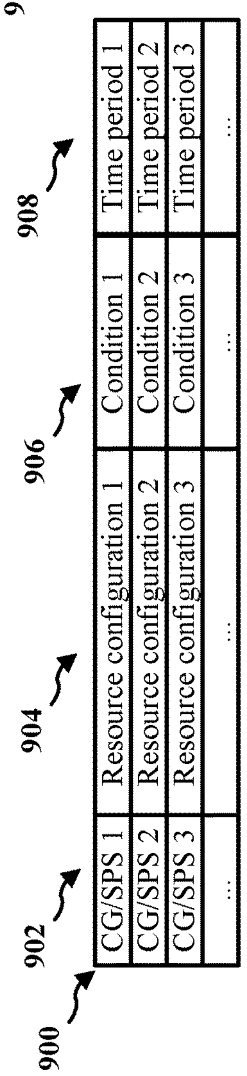
FIG. 9A is a diagram illustrating an example table including multiple configurations or SPS configurations, in accordance with various aspects of the present disclosure.
Figure 9B:
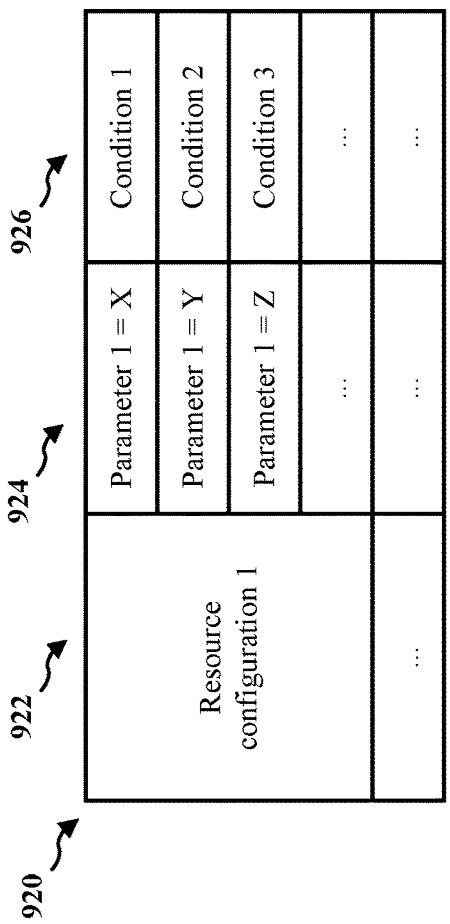
FIG. 9B is a diagram illustrating an example table including a single resource configuration with different parameter values, in accordance with various aspects of the present disclosure.

FIG. 9D is a diagram illustrating a second pattern 960 of resources, as presented herein. In the illustrated example of FIG. 9D, the second pattern 960 includes a mapping between occasions 962 and resources 964. In the illustrated example of FIG. 9D, the resources 964 are indicated by a corresponding resource index, such as the indices 902 of FIG. 9A. As shown in FIG. 9D, a particular resource may be applied to multiple occasions. For example, the resource indicated by CG/SPS 1 may be used for occasion 1 to occasion K, the resource indicated by CG/SPS 2 may be used for occasion K+1 to occasion N, and so forth. Similar to the example of FIG. 9C, as the number of a resource index increases, the size of the corresponding resource also increases.

Returning to the example of FIG. 8, in some examples, the UE 804 may receive (e.g., via the pattern 826) a resource ID of a baseline pattern, such as a resource ID of a first resource of a pattern. In some examples, the UE 804 may be configured (or pre-configured) with a technique to determine the next resource ID. For example, the pattern 826 may indicate a resource ID of a baseline resource and the UE 804 may select (e.g., via the selection procedure 842) additional time/frequency resources of the pattern based on the baseline resource and at least one of a defined rule or a configured parameter. For example, the UE 804 may select additional RBs in the frequency domain or slots/symbols in the time domain. In some examples, the UE 804 may receive the defined rule or configured parameter from the network entity 802 via control signaling, such as RRC signaling, a MAC-CE, and/or DCI.

An example of a defined rule or a configured parameter includes changing the resource configuration for each subsequent transmission or reception occasion, such as described in connection with the first pattern 940 of FIG. 9C. As another example, the UE 804 may be configured to change the resource configuration for a configured number of transmission or reception occasion, such as described in connection with the second pattern 960 of FIG. 9D. As another example, the UE 804 may be configured to change the resource configuration based on an interval of time period of the remaining time budget. For example, the UE 804 may partition the remaining time budget into N intervals and may change the resource configuration based on the interval of the current transmission or reception occasion.

In some examples, the UE 804 may perform the adaptation procedure 844 to increase the size of resources used for exchanging communication with the network entity 802. For example, the UE 804 may increase the size of resources for a next transmission or reception occasion to accommodate for a reduced remaining delay budget. In some examples, performing the adaptation procedure 844 may include changing a frequency allocation, a time duration allocation, a periodicity, and/or a starting time for a next transmission or reception occasion of the multiple transmission or reception occasions. For example, with respect to the baseline size information 810, the adapted resources may include a different (e.g., larger) frequency allocation for the next transmission or reception occasion. In some examples, the adapted resources may include a different (e.g., larger) time duration allocation for the next transmission or reception occasion. In some examples, the adapted resources may include a different (e.g., shorter) periodicity for the next transmission or reception occasion. In some examples, the adapted resources may include a different (e.g., earlier) starting time for the next transmission or reception occasion.

In some examples, when the UE 804 is adapting resources (e.g., via the adaptation procedure 844), the UE 804 may select the adaptation to apply and/or the resources to use, for example, when a condition is met. For example, when a first condition is met, the UE 804 may perform a selection procedure 842 to select the adaptation to apply. The UE 804 may select the adaptation to apply based on one or more configuring parameters, based on an indication, based on a procedure, based on a rule, based on a function, based on a table, etc.

As shown in FIG. 8, the UE 804 and the network entity 802 may exchange communication at a transmission or reception occasion 854. In some examples, the UE 804 and the network entity 802 may exchange communication 850 using a current resource allocation. For example, if the UE 804 determines that a time-based threshold and/or an occasions-based threshold is not met (e.g., based on the measurement procedure 840), then the UE 804 and the network entity 802 may exchange the communication 850 using the current resource allocation.

In other examples, if the UE 804 determines that a time-based threshold and/or an occasions-based threshold is met (e.g., based on the measurement procedure 840), then the UE 804 and the network entity 802 may exchange communication 852 using adapted resources. For example, the network entity 802 and the UE 804 may exchange the communication 852 using the resources after performing the adaptation procedure 844.

It may be appreciated that the current resource allocation used for the communication 850 may include the baseline resource or previously adapted resources. For example, in one example, the condition 820 and the indication of the adaptable parameter 822 may indicate two thresholds and two resource configurations. In some such examples, the network entity 802 and the UE 804 may use the baseline resources when both thresholds are not satisfied. The network entity 802 and the UE 804 may use a first resource configuration when a first threshold is satisfied and the second threshold is not satisfied. The network entity 802 and the UE 804 may use a second resource configuration when both thresholds are satisfied. In some such examples, the UE 804 may determine (e.g., via the measurement procedure 840) that neither threshold is satisfied for a first transmission or reception occasion, that the first threshold is satisfied and the second threshold is not satisfied for a second transmission or reception occasion and third transmission or reception occasion, and that both thresholds are satisfied for a fourth transmission or reception occasion. In some such examples, the UE 804 and the network entity 802 may use the baseline resource for a first communication at the first transmission or reception occasion. The UE 804 and the network entity 802 may use the first resource configuration for a second communication at the second transmission or reception occasion and a third communication at the third transmission or reception occasion. The UE 804 and the network entity 802 may then use the second resource configuration for a fourth communication at the fourth transmission or reception occasion. In the above example, the first communication may correspond to the communication 850 (e.g., using the current resource allocation), the second communication may correspond to the communication 852 (e.g., using adapted resources), the third communication may correspond to the communication 850 (e.g., using the current resource allocation), and the fourth communication may correspond to the communication 852 (e.g., using adapted resources).

In some examples, an adaptation may be applied for a period of time. For example, the network entity 802 may provide time periods 908 (e.g., of FIG. 9A) that are associated with a respective resource configuration. In some such examples, the UE 804 may use the adapted resource for the duration of the time period and then switch to communicating without the adaptation after the duration of the time period. For example, after performing the adaptation procedure 844 to adapt the resources for the communication 852, the UE 804 may perform a monitoring procedure 860 to monitor for when a period of time associated with the adapted resources expires. For example, when using the second resource configuration of the table 900 of FIG. 9A, the UE 804 may start a timer set to the second time period ("Time period 2").

In some examples when the timer expires (e.g., after the duration of the second time period), the UE 804 and the network entity 802 may exchange communication 862. In some examples, the UE 804 and the network entity 802 may use baseline resources (e.g., based on the baseline size information 810) to exchange the communication 862. In another example, the UE 804 and the network entity 802 may use the resources used prior to performing the adaptation procedure 844.

Figure 10A:
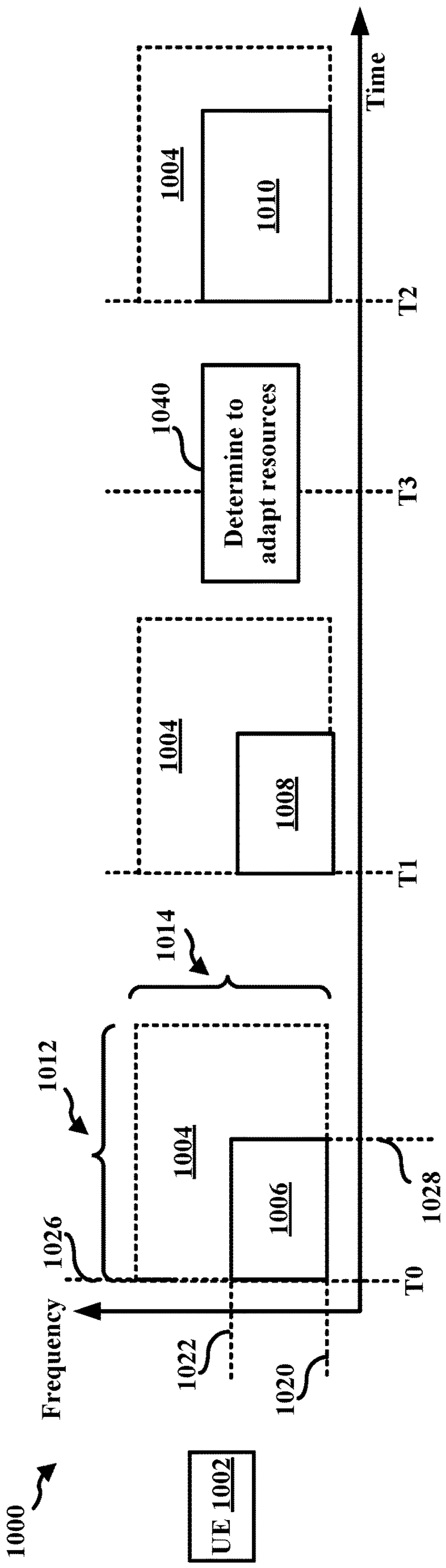
FIG. 10A illustrates a first timing diagram illustrating examples of resource allocations at a UE, in accordance with various aspects of the present disclosure.

FIG. 10A illustrates a first timing diagram 1000 illustrating examples of resource allocations at a UE 1002, as presented herein. In the illustrated example of FIG. 10A, the first timing diagram 1000 illustrates a change in resources for transmission or reception occasions over time. For example, at a time T0, the UE 1002 may be configured with a first resource allocation 1004. The first resource allocation 1004 may represent resources (e.g., time/frequency resources) for a transmission or reception occasion based on a CG configuration or an SPS configuration. As shown in FIG. 10A, the first resource allocation 1004 occupies time duration resources 1012 in the time domain and frequency resources 1014 in the frequency domain.

As described in connection with the example of FIG. 8, the UE 1002 may be configured with a baseline size configuring one or more parameters associated with transmission or reception occasions. For example, the UE 1002 may be configured with a baseline allocation 1006. In some aspects, the baseline allocation 1006 may correspond to a smallest amount of resources that a UE may select for a transmission or reception occasion.

In some examples, the baseline allocation 1006 of resources may be indicated via a minimum RB 1020 and a maximum RB 1022 in the frequency domain. In some examples, the baseline allocation 1006 of resources may also be provided via a first OFDM symbol 1026 and a last OFDM symbol 1028 in the time domain. In some examples, the last OFDM symbol 1028 may be indicated via a size of a time domain resource (e.g., a time duration) or an offset with respect to the first OFDM symbol 1026. As shown in FIG. 10A, the baseline allocation 1006 may be smaller than the first resource allocation 1004. Aspects of indicating the baseline allocation 1006 may be similar to the baseline size information 810 of FIG. 8.

The UE 1002 may then adapt the resources for a transmission or reception occasion based on one or more conditions being met. For example, at a time T1, the UE 1002 may select to use a second resource allocation 1008 that is the same as the baseline allocation 1006. As shown in FIG. 10A, at a time T2, the UE 1002 may select to use a third resource allocation 1010 that is larger than the second resource allocation 1008, but less than the first resource allocation 1004.

The UE 1002 may determine to increase the resource allocation between the time T1 and the time T2 based on one or more conditions being met. For example, at a time T3, the UE 1002 may perform a determination procedure 1040 and determine to adapt resources, such as the time/frequency size, of the baseline allocation 1006. For example, as described in in connection with the measurement procedure 840 of FIG. 8, the UE 1002 may measure a remaining time budget for a transport block and determine to increase the resource allocation when the remaining time budget satisfies a first threshold (e.g., the remaining time budget is less than or equal to a first time threshold). Aspects of the remaining time budget may be similar to the time diagram 510 of FIG. 5.

Figure 10B:
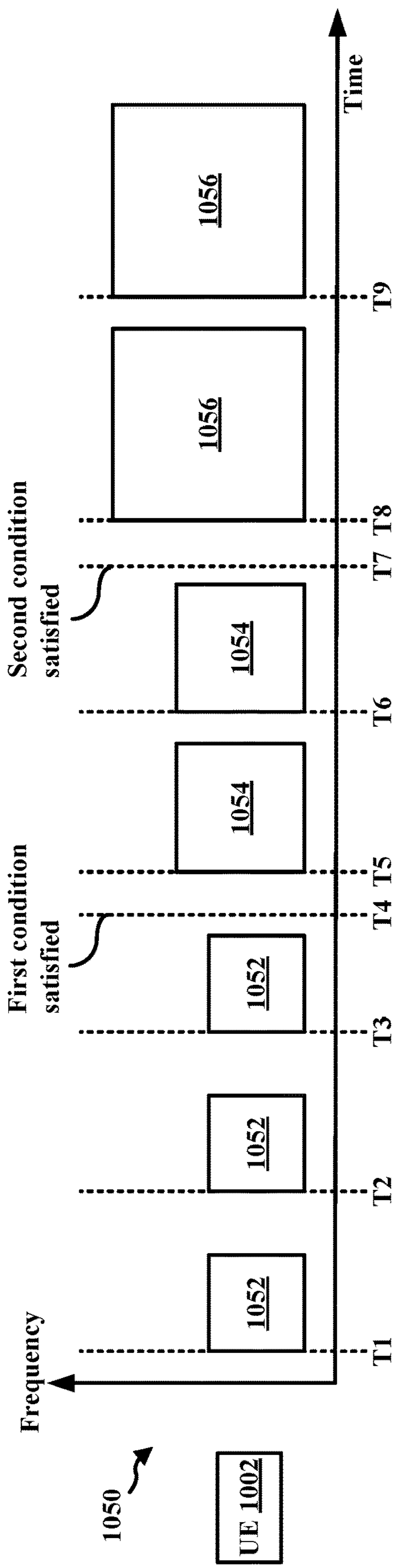
FIG. 10B illustrates a second timing diagram that illustrates an adaptation of resources over time, in accordance with various aspects of the present disclosure.

FIG. 10B illustrates a second timing diagram 1050 that illustrates an adaptation of resources over time, as presented herein. The selected resources of the second timing diagram 1050 may be based on the first resource allocation 1004, the baseline allocation 1006, and the second resource allocation 1008 of the first timing diagram 1000.

In the illustrated example of the second timing diagram 1050, the UE 1002 may select a first resource allocation 1052 for multiple transmission or reception occasions. The first resource allocation 1052 may correspond to a baseline allocation provided by a network entity. For example, the UE 1002 may use the first resource allocation 1052 for a first transmission or reception occasion at a time T1, for a second transmission or reception occasion at a time T2, and for a third transmission or reception occasion at a time T3. In the illustrated example of FIG. 10B, the transmission or reception occasions at the time T1, the time T2, and the time T3 may be associated with a same CG configuration or a same SPS configuration. In some examples, the resources associated with the occasions at the time T1, the time T2, and the time T3 may be activated by a single activation indicator (e.g., a single DCI).

At a time T4, the UE 1002 may determine that a first condition is satisfied (or met). In the example of FIG. 10B, the first condition may correspond to a time threshold. The UE 1002 may determine that the first condition is met, for example, by measuring a remaining time budget, as described in connection with the determination procedure 1040 of the first timing diagram 1000. In some such examples, the UE 1002 may determine to adapt the resources to use subsequent transmission or reception occasions when the first condition is met. For example, the UE 1002 may use a second resource allocation 1054 for a fifth transmission or reception occasion at a time T5 and a sixth transmission or reception occasion at a time T6. As shown in FIG. 10B, the second resource allocation 1054 is larger than the first resource allocation 1052 (e.g., the second resource allocation 1054 has an increased RB allocation in the frequency domain and/or an increased time duration in the time domain compared to the first resource allocation 1052).

At a time T7, the UE 1002 may determine that a second condition is satisfied (or met). In the example of FIG. 10B, the second condition may correspond to a time threshold. In some such examples, the UE 1002 may determine to further adapt the resources to use for subsequent transmission or reception occasions. For example, the UE 1002 may use a third resource allocation 1056 for a seventh transmission or reception occasion at a time T8 and an eight transmission or reception occasion at a time T9. As shown in FIG. 10B, the third resource allocation 1056 is larger than the second resource allocation 1054 (e.g., the third resource allocation 1056 has an increased RB allocation in the frequency domain and/or an increased time duration in the time domain compared to the second resource allocation 1054).

With respect to the example of FIG. 8, communication at the time T1, the time T2, the time T3, the time T6, and the time T9 may correspond to the communication 850 using a current resource allocation. Additionally, communication at the time T5 and time T8 may correspond to the communication 852 using adapted resources. Examples of the first threshold at the time T4 and/or the second threshold at the time T7 may include one or more of a time threshold, a delay parameter threshold, a threshold number of PUSCH transmission occasions, and/or a threshold number of PDSCH reception occasions.

In some examples, the adaptation from one resource allocation to another resource allocation may be relative to the baseline allocation. For example, when compared to the baseline allocation (e.g., the first resource allocation 1052), the second resource allocation 1054 may be 5% larger in at least one of the frequency domain and the time domain. Additionally, when compared to the baseline allocation (e.g., the first resource allocation 1052), the third resource allocation 1056 may be 10% larger in at least one of the frequency domain and the time domain.

In other examples, the adaptation from one resource allocation to another resource allocation may be relative to a current resource allocation. For example, the second resource allocation 1054 may be 5% larger in at least one of the frequency domain and the time domain when compared to the first resource allocation 1052. Additionally, the third resource allocation 1056 may be 5% larger in at least one of the frequency domain and the time domain when compared to the second resource allocation 1054.

Figure 11:
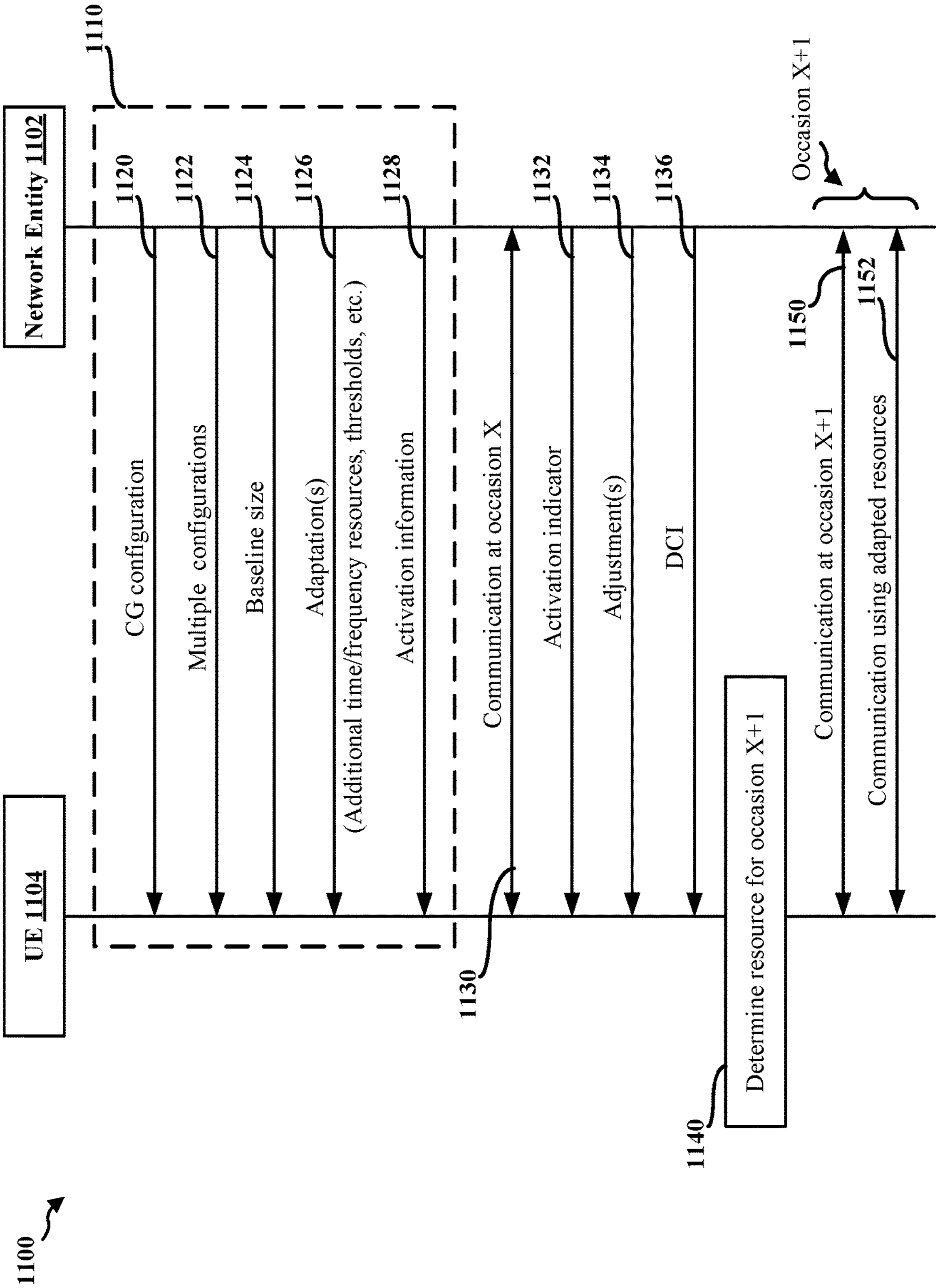
FIG. 11 illustrates an example communication flow between a network entity and a UE, in accordance with various aspects of the present disclosure.

FIG. 11 illustrates an example communication flow 1100 between a network entity 1102 and a UE 1104, as presented herein. One or more aspects described for the network entity 1102 may be performed by a component of a base station or a network entity, such as a CU, a DU, and/or an RU. In the illustrated example, the communication flow 1100 facilitates improving communication performance by increasing resources for semi-static configured resources over time. Aspects of the network entity 1102 may be implemented by the base station 102 of FIG. 1, the base station 310 of FIG. 3, and/or the network entity 802 of FIG. 8. Aspects of the UE 1104 may be implemented by the UE 104 of FIG. 1, the UE 350 of FIG. 3, and/or the UE 804 of FIG. 8. Although not shown in the illustrated example of FIG. 11, in additional or alternate examples, the network entity 1102 and/or the UE 1104 may be in communication with one or more other base stations or UEs.

In the illustrated example of FIG. 11, the network entity 1102 and the UE 1104 may exchange control information 1110. As described in connection with the type 1 CG mechanism of FIG. 7, the control information 1110 may configure one or more CG configurations. For example, the network entity 1102 may provide a CG configuration 1120 that is received by the UE 1104. The CG configuration 1120 may configure and activate the respective CG. For example, the CG configuration 1120 may schedule one or more transmission occasions at the UE 1104. In some examples, the control information 1110 may include RRC signaling.

As shown in FIG. 11, the network entity 1102 may provide baseline size information 1124 that is received by the UE 1104. Aspects of the baseline size information 1124 may be similar to the baseline size information 810 of FIG. 8. For example, the baseline size information 1124 may indicate one or more of time/frequency resources, periodicity, starting time, etc. As shown in FIG. 11, the UE 1104 may receive the baseline size information 1124 via the control information 1110, such as RRC signaling.

The network entity 1102 may also provide an indication of one or more adaptations indicating one or more conditions, one or more adaptable parameters, one or more procedures, etc. For example, the network entity 1102 may provide an adaptation indication 1126 that is received by the UE 1104. The adaptation indication 1126 may indicate, for example, additional time duration resources (e.g., additional slots/symbols), additional frequency resources (e.g., additional RBs), additional or different thresholds, etc. As shown in FIG. 11, the UE 1104 may receive the adaptation indication 1126 via the control information 1110, such as RRC signaling.

In the illustrated example of FIG. 11, the network entity 1102 and the UE 1104 may exchange communication 1130 at occasion X. In some examples, the network entity 1102 and the UE 1104 may use a baseline resource for the communication 1130. For example, the network entity 1102 and the UE 1104 may use the baseline resource indicated by the baseline size information 1124. Aspects of the communication 1130 may be similar to the communication 850 of FIG. 8.

As shown in FIG. 11, the UE 1104 may perform a determination procedure 1140 to determine which resource to use for communication at an occasion X+1. Aspects of the determination procedure 1140 may be similar to the measurement procedure 840, the selection procedure 842, and/or the adaptation procedure 844 of FIG. 8. For example, the UE 1104 may compare a measurement to a threshold (e.g., a time-based threshold, an occasion-based threshold, etc.). The UE 1104 may also, based on the comparison, determine to use either a current resource allocation or an adapted resource allocation to exchange communication with the network entity 1102 at the occasion X+1. For example, the UE 1104 may exchange communication 1150 at occasion X+1 using a current resource allocation, for example, if the threshold is not met. That is, the UE 1104 may use the same resource allocation for exchanging the communication 1130 at occasion X and for exchanging the communication 1150 at occasion X+1. In other examples, the UE 1104 may use adapted resources to exchange communication 1152 at the occasion X+1, for example, if the threshold is met. The adapted resources used for the communication 1152 may be larger than the resource allocation used for the communication 1150. For example, compared to the resource allocation used for the communication 1150, the adapted resources may include at least one of more RBs, a longer time duration, a higher MCG, a lower periodicity, a larger repetition factor, etc.

In some examples, the adapted resources may be based on CG indices. For example, the network entity 1102 may provide multiple configurations 1122 that are received by the UE 1104. As shown in FIG. 11, the network entity 1102 may provide the multiple configurations 1122 via the control information 1110. The multiple configurations 1122 may include more than one CG configuration. Aspects of the multiple configurations 1122 may be similar to the multiple resource configurations 720 of FIG. 7 and the table 900 of FIG. 9A. In some such examples, the UE 1104 may switch CG indices when the UE 1104 determines to adapt resources. For example, and referring to the example table 900 of FIG. 9A, the UE 1104 may use a first resource configuration ("Resource configuration 1"), as indicated by the first index ("CG/SPS 1") for the communication 1130 and the communication 1150. The UE 1104 may use a second resource configuration ("Resource configuration 2"), as indicated by the second index ("CG/SPS 2") for the communication 1152. The second resource configuration may be associated with a larger size than the first resource configuration.

In some examples, the network entity 1102 may provide a procedure for switching between CG indices. For example, the multiple configurations 1122 may include respective thresholds that, when satisfied, indicate which resource configuration to use for a communication. In some such examples, the UE 1104 may determine (e.g., via the determination procedure 1140) to use a resource configuration based on a respective threshold being satisfied. It may be appreciated that in some examples, the UE 1104 may determine to "skip" a resource configuration based on a threshold being met. For example, and in the example above, the UE 1104 may use the first resource configuration for the communication 1130 and the communication 1150. The UE 1104 may determine (e.g., via the determination procedure 1140) that a measurement satisfies a third condition ("Condition 3") associated with a third resource configuration ("Resource configuration 3"). In some such examples, the UE 1104 may use the third resource condition to exchange the communication 1152.

In some examples, the network entity 1102 may activate a CG configuration using a separate activation message. For example, the network entity 1102 may provide an activation indicator 1132 that is received by the UE 1104. The network entity 1102 may provide the activation indicator 1132 via a MAC-CE or DCI (e.g., an activation DCI or a reactivation DCI). The activation indicator 1132 may activate one or more CG configurations at the UE 1104, such as the first resource configuration 712 of FIG. 7. For example, the activation indicator 1132 may schedule one or more transmission occasions at the UE 1104. In some examples, the activation indicator 1132 may include at least one of a time adjustment or a frequency adjustment for the adaptation at the one or more transmission occasions. In some examples, the UE 1104 may determine the resource to use at occasion X+1 (e.g., via the determination procedure 1140) based on the CG configuration indicated by the activation indicator 1132.

In some examples, as the UE 1104 may not expect a separate activation message when using the type 1 CG mechanism, the network entity 1102 may provide activation information 1128, that is received by the UE 1104. The network entity 1102 may provide the activation information 1128 via RRC signaling, such as the control information 1110. The activation information 1128 may include one or more parameters for the UE 1104 to monitor to receive the activation indicator 1132. The activation information 1128 may include one or more of a radio network temporary identifier (RNTI), a CORESET, and/or a resource allocation associated with the activation indicator 1132.

In some examples, one or more adaptations may be modified after being provided to the UE 1104. For example, based on a first adaptation (e.g., received via the adaptation indication 1126), the UE 1104 may determine to increase the baseline allocation by 5% in at least one of the frequency domain and the time domain, for example, when a first threshold is satisfied. In some examples, the network entity 1102 may determine that the increase of 5% in resources is unable to meet the communication demands at a transmission or reception occasion. In some such examples, the network entity 1102 may determine to modify the adaptation from a 5% increase to a 10% increase when the first threshold is satisfied. For example, the network entity 1102 may provide one or more adjustments 1134 (e.g., via one or more indications) that are received by the UE 1104. The one or more adjustments 1134 may indicate for the UE 1104 to modify one or more adaptations previously provided to the UE 1104. The network entity 1102 may provide the one or more adjustments 1134 via a MAC-CE and/or DCI (e.g., an adjustment DCI).

As used herein, an activation DCI (or a reactivation DCI) may refer to a DCI that activates (or reactivates) one or more resource configurations. Additionally, as used herein, an adjustment DCI may refer to a DCI that includes information regarding an adaptation. In some aspects, an activation DCI and an adjustment DCI may refer to a same DCI. For example, a DCI may include first information to activate one or more resource configurations and may include second information regarding an adaptation for one or more of the resource configurations.

In some examples, the activation indicator 1132 may be comprised in a DCI. For example, the network entity 1102 may provide a DCI 1136 that is received by the UE 1104. The DCI 1136 may indicate for the UE 1104 to start use of adapted resources. In some examples, the DCI 1136 may indicate a time adjustment and/or a frequency adjustment for the adaptation. In some examples, the DCI 1136 may include the one or more adjustments 1134. In some examples, the DCI 1136 may be PDCCH-based with a fixed configuration linked to an activation DCI. In some examples, the DCI 1136 may be one or more bits-based and linked to an activation DCI. As used herein, the term "X linked to Y" refers to the ability to determine at least one of time/frequency resources or a configuration of "X" based on "Y," or vice versa.

Figures 12A, 12B:
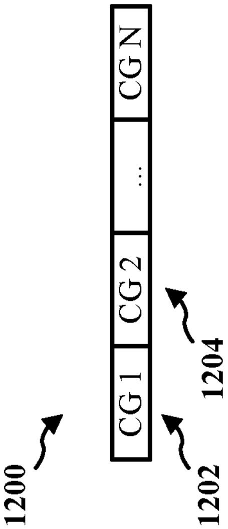
FIG. 12A illustrates an example downlink control information (DCI), in accordance with various aspects of the present disclosure.
FIG. 12B illustrates a table including multiple adjustments, in accordance with various aspects of the present disclosure.

As an example, FIG. 12A illustrates an example DCI 1200, as presented herein. The DCI 1200 may correspond to the DCI 1136 of FIG. 11. In the example of FIG. 12A, the DCI 1200 includes multiple fields, and each field of the DCI 1200 maps to a different CG configuration. For example, and with respect to the table 900 of FIG. 9A, a first field 1202 of the DCI 1200 may map to a first CG configuration, a second field 1204 of the DCI 1200 may map to a second CG configuration, and so forth.

In some examples, each field of the DCI 1200 may be 1-bit in length. In some such examples, the DCI 1200 may indicate one or more CG configurations for the UE 1104 to start using for the transmission occasions. For example, a first value (e.g., a "1") in a field may indicate to start using the corresponding CG configuration, and a second value (e.g., a "0") in the field may indicate to not start or to stop using the corresponding CG configuration. As an example, a DCI may include a value of "01" corresponding to the first field 1202 and the second field 1204. In some such examples, the value of "0" in the first field 1202 may indicate to not start using or to stop using the first CG configuration. Additionally, the value of "1" in the second field 1204 may indicate to start using the second CG configuration.

Referring again to the example of FIG. 11, in some examples, the network entity 1102 may provide the DCI 1136 prior to a transmission or reception occasion. For example, the network entity 1102 may provide the DCI 1136 before the communication 1130 at occasion X and may provide the DCI 1136 before the communication at occasion X+1.

In some examples, the DCI 1136 may be configured to include multiple-bit fields. In some such examples in which the fields of the DCI 1136 include more than one bit, the DCI 1136 may indicate a time/frequency resource for the UE 1104 to use or to select, or may indicate an adaptation to apply. For example, the DCI 1136 indicate at least one of a time adjustment or a frequency adjustment to use for the adapted resources. In some examples, the adjustments may be selected from previously configured adaptations. For example, FIG. 12B illustrates a table 1220 including multiple adjustments, as presented herein. For example, a first column 1222 identifies a different adjustment index and a second column 1224 indicates an adjustment to apply. As shown in FIG. 12B, in some examples, an adjustment may indicate a resource allocation. For example, when a first adjustment ("Adjustment 1") is indicated, the UE 1104 determines to "Use a second resource configuration" when exchanging the communication using adapted resources (e.g., the communication 1152). In some examples, an adjustment may indicate an adjustment as a percentage. For example, a second adjustment ("Adjustment 2") indicates for the UE 1104 to increase the number of RBs 5% in the frequency domain. As another example, a third adjustment ("Adjustment 3") indicates for the UE 1104 to increase the time duration by 5% in the time domain. However, other examples may include additional or alternate techniques to indicate an adjustment (or adaptation).

Figure 13:
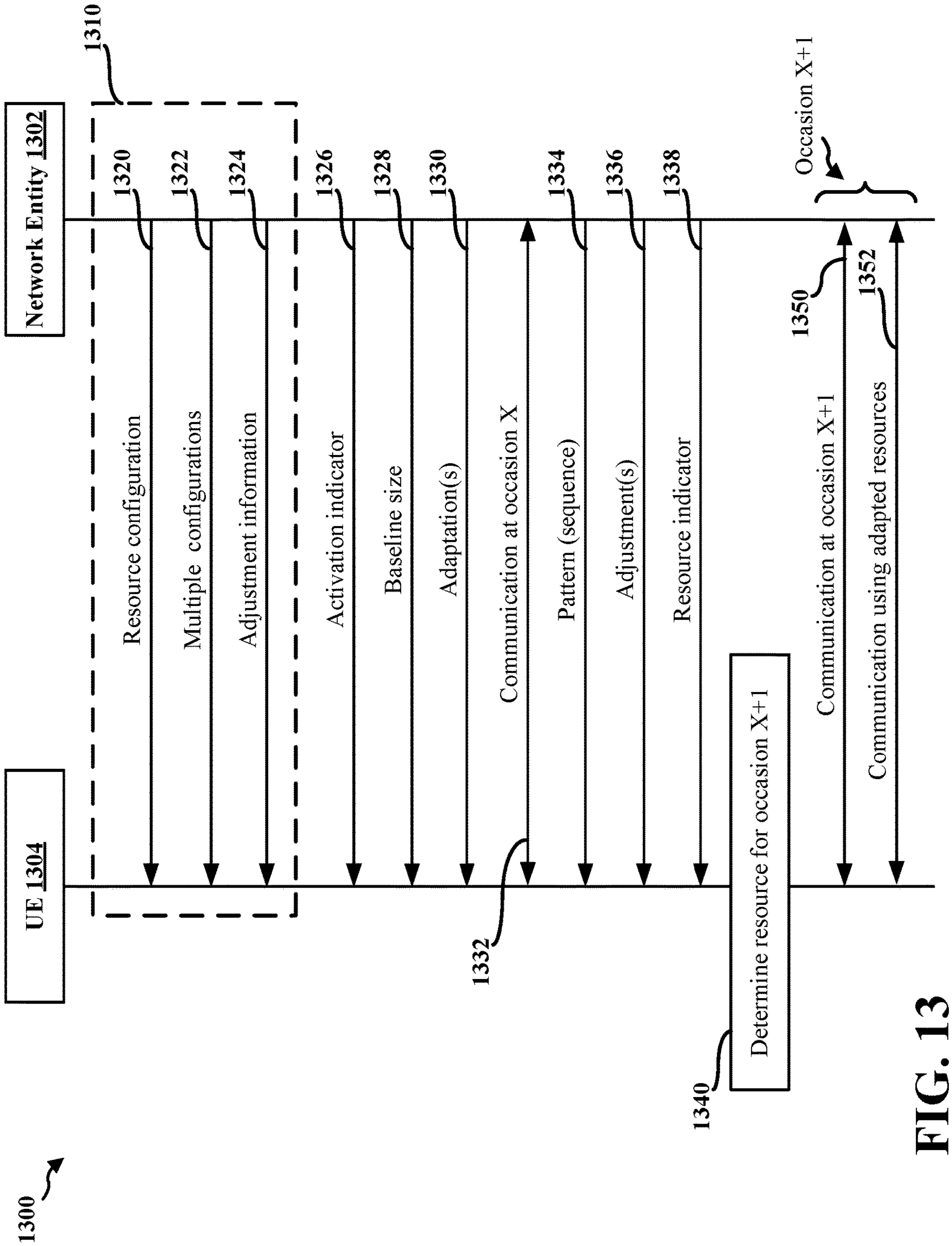
FIG. 13 illustrates an example communication flow between a network entity and a UE, in accordance with various aspects of the present disclosure.

FIG. 13 illustrates an example communication flow 1300 between a network entity 1302 and a UE 1304, as presented herein. One or more aspects described for the network entity 1302 may be performed by a component of a base station or a network entity, such as a CU, a DU, and/or an RU. In the illustrated example, the communication flow 1100 facilitates improving communication performance by increasing resources for semi-static configured resources over time. Aspects of the network entity 1302 may be implemented by the base station 102 of FIG. 1, the base station 310 of FIG. 3, the network entity 802 of FIG. 8, and/or the network entity 1102 of FIG. 11. Aspects of the UE 1304 may be implemented by the UE 104 of FIG. 1, the UE 350 of FIG. 3, the UE 804 of FIG. 8, and/or the UE 1104 of FIG. 11. Although not shown in the illustrated example of FIG. 13, in additional or alternate examples, the network entity 1302 and/or the UE 1304 may be in communication with one or more other base stations or UEs.

In the illustrated example of FIG. 13, the network entity 1302 and the UE 1304 may exchange control information 1310. As described in connection with the type 2 CG/SPS mechanism of FIG. 7, the control information 1310 may configure one or more CG configurations. For example, the network entity 1302 may provide a resource configuration 1320 that is received by the UE 1304. The resource configuration 1320 may configure a respective CG or SPS grant at the UE 1304. In some examples, the control information 1310 may include RRC signaling In some examples, the network entity 1302 may provide multiple configurations 1322 that are received by the UE 1304. As shown in FIG. 13, the network entity 1302 may provide, and the UE 1304 may receive, the multiple configurations 1322 via the control information 1310. The multiple configurations 1322 may include more than one CG/SPS configuration. In some examples, the multiple configurations 1322 may include at least one resource configuration configured with different values for a same parameter. Aspects of the multiple configurations 1322 may be similar to the multiple resource configurations 720 of FIG. 7, the table 900 of FIG. 9A, and/or the table 920 of FIG. 9B.

In the illustrated example of FIG. 13, the network entity 1302 provides an activation indicator 1326 that is received by the UE 1304. The activation indicator 1326 activates one or more CG/SPS configurations at the UE 1304. For example, the activation indicator 1326 may schedule one or more transmission occasions or reception occasions at the UE 1304. As shown in the example of FIG. 13, the network entity 1302 provides the activation of one or more resources in a message (e.g., the activation indicator 1326) that is separate from the configuration of the resource (e.g., via the resource configuration 1320) and the multiple configurations 1322).

The network entity 1302 may provide, and the UE 1304 may receive, the activation indicator 1326 via a MAC-CE or DCI. The activation indicator 1326 may activate a resource configuration (e.g., a CG/SPS configuration) at the UE 1304, such as the resource configuration 1320, one or more of the multiple configurations 1322, and/or the first resource configuration 712 of FIG. 7.

In some examples, the network entity 1302 may provide baseline size information 1328 that is received by the UE 1304. The network entity 1302 may provide, and the UE 1304 may receive, the baseline size information 1328 via the activation indicator 1326 (e.g., via a MAC-CE or DCI). Aspects of the baseline size information 1328 may be similar to the baseline size information 810 of FIG. 8. For example, the baseline size information 1328 may indicate one or more of time/frequency resources, periodicity, starting time, etc.

In some examples, the baseline size information 1328 may indicate a baseline size that is larger than a transport block size. In some examples, the baseline size information 1328 may indicate a baseline size that may be suitable for more than one transport block. In examples in which the baseline size is larger than a transport block size, the UE 1304 may be configured to increase reliability for successful PUSCH transmission or successful PDSCH reception, for example, by lowering the coding rate.

The network entity 1302 may also provide one or more adaptations indicating one or more conditions, one or more adaptable parameters, one or more procedures, etc. For example, the network entity 1302 may provide an adaptation indication 1330 that is received by the UE 1304. The adaptation indication 1330 may indicate, for example, additional time duration resources (e.g., additional slots/symbols), additional frequency resources (e.g., additional RBs), additional or different thresholds, etc. In some examples, the network entity 1302 may provide the adaptation indication 1330 and the activation indicator 1326 via a same message.

In the illustrated example of FIG. 13, the network entity 1302 and the UE 1304 may exchange communication 1332 at occasion X. The network entity 1302 and the UE 1304 may exchange the communication 1332 using one or more resources activated by the activation indicator 1326. Aspects of the communication 1332 may be similar to the communication 850 of FIG. 8.

As shown in the example of FIG. 13, the UE 1304 may perform a determination procedure 1340 to determine which resource to use for an occasion X+1. Aspects of the determination procedure 1340 may be similar to the measurement procedure 840, the selection procedure 842, the adaptation procedure 844 of FIG. 8, and/or the determination procedure 1140 of FIG. 11. For example, the UE 1304 may compare a measurement to a threshold (e.g., a time-based threshold, an occasion-based threshold, etc.). The UE 1304 may also, based on the comparison, determine to use either a current resource allocation or an adapted resource allocation to exchange communication with the network entity 1302 at the occasion X+1.

For example, the UE 1304 may exchange communication 1350 at occasion X+1 using a current resource allocation, for example, if the threshold is not met. That is, the UE 1304 may use the same resource allocation for exchanging the communication 1332 at occasion X and for exchanging the communication 1350 at occasion X+1. In other examples, the UE 1304 may use adapted resources to exchange communication 1352 at the occasion X+1, for example, if the threshold is met. The adapted resources used for the communication 1352 may be larger than the resource allocation used for the communication 1350. For example, compared to the resource allocation used for the communication 1350, the adapted resources may include at least one of more RBs, a longer time duration, a higher MCG, a lower periodicity, a larger repetition factor, etc.

In some examples, the adapted resources may be based on CG/SPS indices. For example, the UE 1304 may switch CG/SPS indices when the UE 1304 determines to adapt resources. For example, and referring to the example table 900 of FIG. 9A, the UE 1304 may use a first resource configuration ("Resource configuration 1"), as indicated by the first index ("CG/SPS 1") for the communication 1332 and the communication 1350. The UE 1304 may use a second resource configuration ("Resource configuration 2"), as indicated by the second index ("CG/SPS 2") for the communication 1352. The second resource configuration may be associated with a larger size than the first resource configuration, as described in connection with the second resource allocation 1008 and the third resource allocation 1010 of FIG. 10A.

In some examples, the network entity 1302 may provide a procedure for switching between CG/SPS indices. For example, the multiple configurations 1322 may include respective thresholds that, when satisfied, indicate which resource configuration to use for a communication. In some such examples, the UE 1304 may determine (e.g., via the determination procedure 1340) to use a resource configuration based on a respective threshold being satisfied. It may be appreciated that in some examples, the UE 1304 may determine to "skip" a resource configuration based on a threshold being met. For example, and in the example above, the UE 1304 may use the first resource configuration for the communication 1332 and the communication 1350. The UE 1304 may determine (e.g., via the determination procedure 1340) that a measurement satisfies a third condition ("Condition 3") associated with a third resource configuration ("Resource configuration 3"). In some such examples, the UE 1304 may use the third resource condition to exchange the communication 1352.

In some examples, the network entity 1302 may provide a pattern 1334 (or sequence) of resources to be used at different occasions of a set of transmission or reception occasions. In some examples, the network entity 1302 may provide the pattern 1334 via the activation indicator 1326. The set of transmission or reception occasions may correspond to a period of occasions. In some examples, the set of transmission or reception occasions may include multiple resource configurations, such as the example table 900 of FIG. 9A and/or the multiple configurations 1322. Aspects of the network entity 1302 providing, and the UE 1304 receiving, the pattern 1334 are described in connection with the pattern 826 of FIG. 8, the first pattern 940 of FIG. 9C and the second pattern 960 of FIG. 9D.

Similar to the example of FIG. 11, one or more conditions and/or adaptations may be modified after being provided to the UE 1304. For example, based on a first adaptation (e.g., received via the adaptation indication 1330), the UE 1304 may determine to increase the baseline allocation by 5% in at least one of the frequency domain and the time domain, for example, when a first threshold is satisfied. In some examples, the network entity 1302 may determine that the increase of 5% in resources is unable to meet the communication demands at a transmission or reception occasion. In some such examples, the network entity 1302 may determine to modify the adaptation from a 5% increase to a 10% increase when the first threshold is satisfied. For example, the network entity 1302 may provide one or more adjustments 1336 that are received by the UE 1304. The one or more adjustments 1336 may indicate for the UE 1304 to modify one or more adaptations previously provided to the UE 1304. The network entity 1302 may provide the one or more adjustments 1336 via the activation indicator 1326 (e.g., a MAC-CE and/or DCI).

In some examples, the one or more adjustments 1336 may be comprised in a DCI. For example, the network entity 1302 may provide the one or more adjustments 1336 via an activation DCI or a reactivation DCI. The one or more adjustments 1336 may indicate for the UE 1304 to start use of adapted resources. In some examples, the one or more adjustments 1336 may indicate a time adjustment and/or a frequency adjustment for the adaptation. In some examples, the DCI may include the one or more adjustments 1134. In some examples, the one or more adjustments 1336 may be PDCCH-based with a fixed configuration linked to an activation DCI (e.g., the activation indicator 1326). In some examples, the one or more adjustments 1336 may be one or more bits-based and linked to an activation DCI (e.g., the activation indicator 1326). Aspects of such a DCI are described in connection with the DCI 1200 of FIG. 12A.

In some examples, the network entity 1302 may provide such a DCI prior to a transmission or reception occasion to indicate which resources the UE 1304 is to use for the respective transmission or reception occasion. For example, the network entity 1302 may provide the activation indicator 1326 before the communication 1332 at occasion X and may provide another activation indicator 1326 before the communication at occasion X+1.

In some examples, the activation indicator 1326 may be configured to include multiple-bit fields. In some such examples in which the fields of the activation indicator 1326 include more than one bit, the activation indicator 1326 may indicate a time/frequency resource for the UE 1304 to use or to select, or may indicate an adaptation to apply. For example, the activation indicator 1326 may indicate at least one of a time adjustment or a frequency adjustment to use for the adapted resources. In the illustrated example of FIG. 13, the network entity 1302 may provide a resource indicator 1338 that is received by the UE 1304. The network entity 1302 may provide the resource indicator 1338 via the activation indicator 1326.

In some examples, the adjustments may be selected from previously configured adaptations. For example, the network entity 1302 may provide adjustment information 1324 that is received by the UE 1304. The network entity 1302 may provide, and the UE 1304 may receive, the adjustment information 1324 via RRC signaling, such as the control information 1310. In some examples, the network entity 1302 may provide, and the UE 1304 may receive, the adjustment information 1324 via a MAC-CE. The adjustment information 1324 may include one or more time/frequency resources and the resource indicator 1338 may indicate one or more of the time/frequency resources. Aspects of the adjustment information 1324 may be similar to the table 1220 of FIG. 12B.

Although not shown in the example of FIG. 13, it may be appreciated that in some examples, one or more of the baseline size information 1328, the adaptation indication 1330, the pattern 1334, the one or more adjustments 1336, and/or the resource indicator 1338 may be included in the control information 1310.

Figure 14:
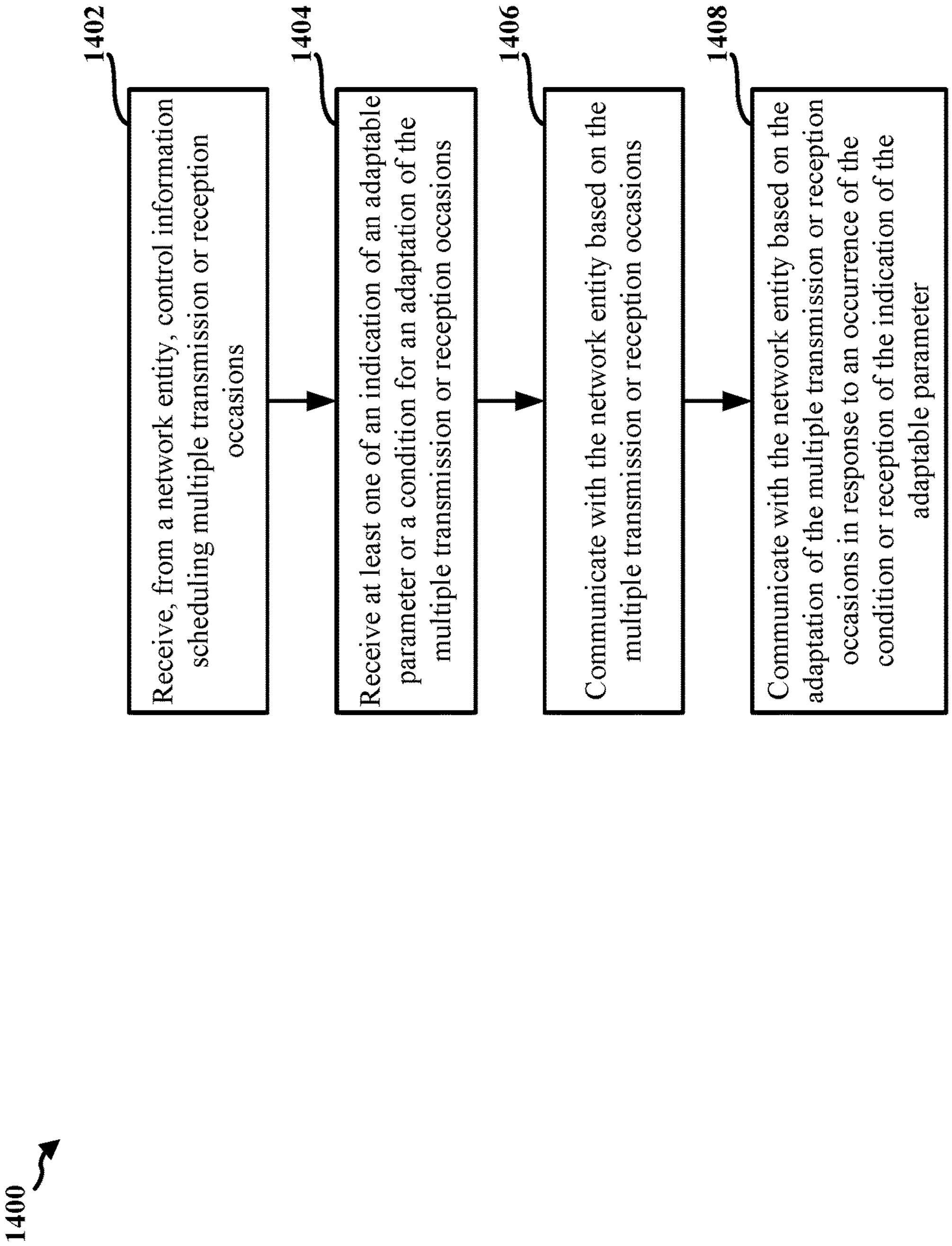
FIG. 14 is a flowchart of a method of wireless communication at a UE, in accordance with the teachings disclosed herein.

FIG. 14 is a flowchart 1400 of a method of wireless communication. The method may be performed by a UE (e.g., the UE 104, and/or an apparatus 1604 of FIG. 16). The method may facilitate improving communication performance by increasing resources for semi-static configured resources over time.

At 1402, the UE receives, from a network entity, control information scheduling multiple transmission or reception occasions, as described in connection with at least the control information 1110, the CG configuration 1120, the multiple configurations 1122, and/or the activation indicator 1132 of FIG. 11, and/or the control information 1310, the resource configuration 1320 and/or the activation indicator 1326 of FIG. 13. The reception, at 1402, may be performed by the resources selection component 198 of the apparatus 1604 and/or a cellular RF transceiver 1622 or one or more antennas 1680 of FIG. 16, as an example.

At 1404, the UE receives at least one of an indication of an adaptable parameter or a condition for an adaptation of the multiple transmission or reception occasions, as described in connection with at least the condition 820 and/or the adaptable parameter 822 of FIG. 8, the adaptation indication 1126 of FIG. 11, and/or the adaptation indication 1330 of FIG. 13. The reception, at 1404, may be performed by the resources selection component 198 of the apparatus 1604 and/or the cellular RF transceiver 1622 or the one or more antennas 1680 of FIG. 16, as an example.

At 1406, the UE communicates with the network entity based on the multiple transmission or reception occasions, as described in connection with at least the communication 850 of FIG. 8, the communication 1130 of FIG. 11, and/or the communication 1332 of FIG. 13. The communication, at 1406, may be performed by the resources selection component 198 of the apparatus 1604 and/or the cellular RF transceiver 1622 or the one or more antennas 1680 of FIG. 16.

At 1408, the UE communicates with the network entity based on the adaptation of the multiple transmission or reception occasions in response to an occurrence of the condition or reception of the indication of the adaptable parameter, as described in connection with at least the communication 852 of FIG. 8, the communication 1152 of FIG. 11, and/or the communication 1352 of FIG. 13. The communication, at 1408, may be performed by the resources selection component 198 of the apparatus 1604 and/or the cellular RF transceiver 1622 or the one or more antennas 1680 of FIG. 16.

Figure 15:
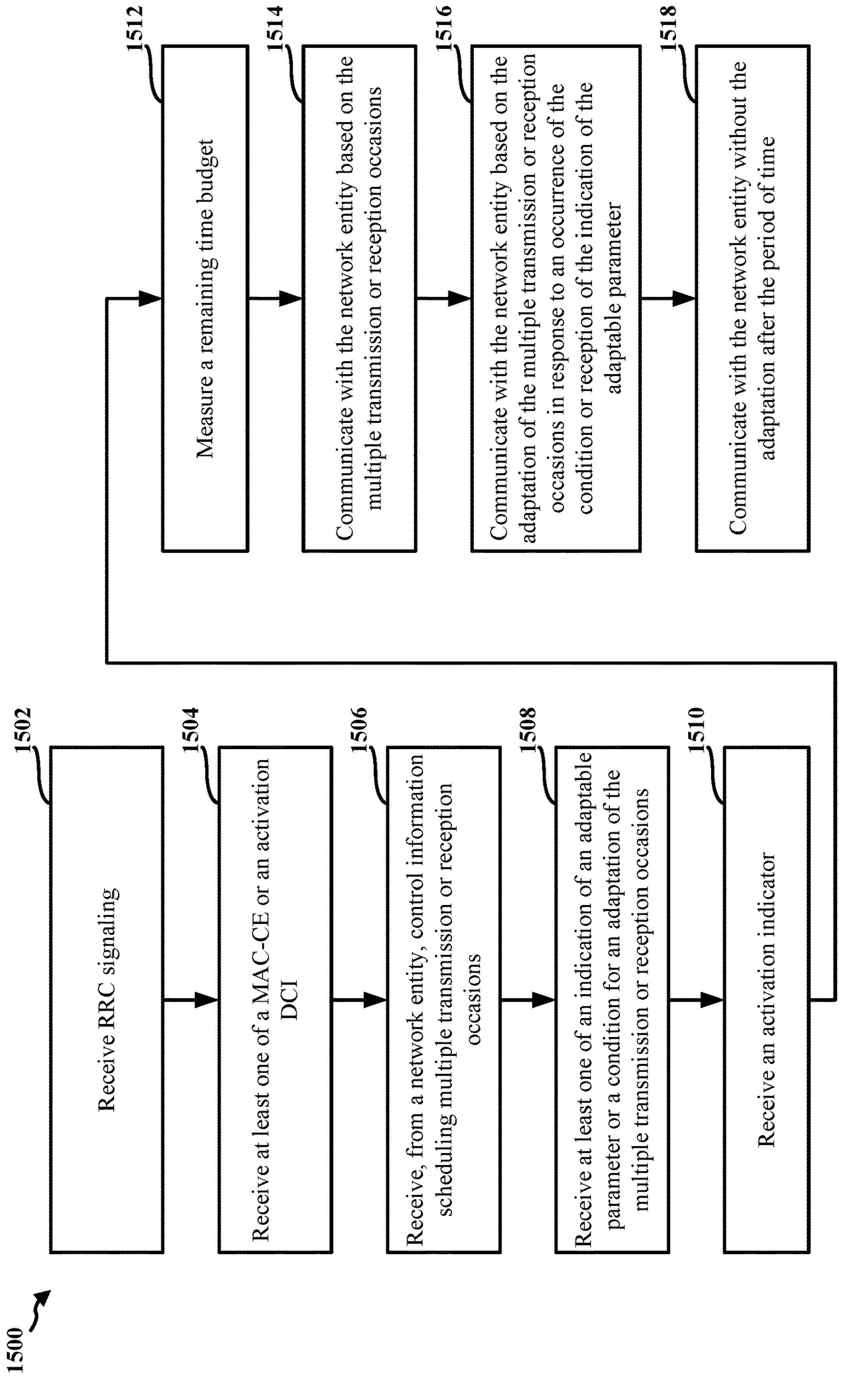
FIG. 15 is a flowchart of a method of wireless communication at a UE, in accordance with the teachings disclosed herein.

FIG. 15 is a flowchart 1500 of a method of wireless communication. The method may be performed by a UE (e.g., the UE 104, and/or an apparatus 1604 of FIG. 16). The method may facilitate improving communication performance by increasing resources for semi-static configured resources over time.

At 1506, the UE receives, from a network entity, control information scheduling multiple transmission or reception occasions, as described in connection with at least the control information 1110, the CG configuration 1120, the multiple configurations 1122, and/or the activation indicator 1132 of FIG. 11, and/or the control information 1310, the resource configuration 1320 and/or the activation indicator 1326 of FIG. 13. The reception, at 1506, may be performed by the resources selection component 198 of the apparatus 1604 and/or a cellular RF transceiver 1622 or one or more antennas 1680 of FIG. 16, as an example.

At 1508, the UE receives at least one of an indication of an adaptable parameter or a condition for an adaptation of the multiple transmission or reception occasions, as described in connection with at least the condition 820 and/or the adaptable parameter 822 of FIG. 8, the adaptation indication 1126 of FIG. 11, and/or the adaptation indication

1330 of FIG. 13. The reception, at 1508, may be performed by the resources selection component 198 of the apparatus 1604 and/or the cellular RF transceiver 1622 or the one or more antennas 1680 of FIG. 16, as an example.

At 1514, the UE communicates with the network entity based on the multiple transmission or reception occasions, as described in connection with at least the communication 850 of FIG. 8, the communication 1130 of FIG. 11, and/or the communication 1332 of FIG. 13. The communication, at 1514, may be performed by the resources selection component 198 of the apparatus 1604 and/or the cellular RF transceiver 1622 or the one or more antennas 1680 of FIG. 16.

At 1516, the UE communicates with the network entity based on the adaptation of the multiple transmission or reception occasions in response to an occurrence of the condition or reception of the indication of the adaptable parameter, as described in connection with at least the communication 852 of FIG. 8, the communication 1152 of FIG. 11, and/or the communication 1352 of FIG. 13. The communication, at 1516, may be performed by the resources selection component 198 of the apparatus 1604 and/or the cellular RF transceiver 1622 or the one or more antennas 1680 of FIG. 16.

In some examples, the UE may receive, at 1510, an activation indicator, as described in connection with at least the CG configuration 1120 and/or the activation indicator 1132 of FIG. 11, and/or the activation indicator 1326 of FIG. 13. In some examples, the activation indicator may comprise control information, such as a single DCI, that activates resources for multiple PUSCH transmissions or multiple PDSCH receptions. In some examples, the single DCI may also include the condition for the adaptation (e.g., at 1508), as described in connection with at least the CG configuration 1120 of FIG. 11 and/or the resource configuration 1320 of FIG. 13. The reception, at 1510, may be performed by the resources selection component 198 of the apparatus 1604 and/or a cellular RF transceiver 1622 or one or more antennas 1680 of FIG. 16, as an example.

In some examples, the control information, at 1506, may configure a CG or an SPS grant indicated in RRC signaling. For example, at 1502, the UE may receive RRC signaling, as described in connection with at least the RRC signaling 710 of FIG. 7, the control information 1110 of FIG. 11, and/or the control information 1310 of FIG. 13. The reception, at 1502, may be performed by the resources selection component 198 of the apparatus 1604 and/or the cellular RF transceiver 1622 or the one or more antennas 1680 of FIG. 16, as an example.

In some examples, the CG or the SPS grant may be active based on the RRC signaling without a separate activation message, as described in connection with the type 1 CG, e.g., at least the example first mechanism of FIG. 7 (e.g., a type 1 CG) and/or the CG configuration 1120 of FIG. 11. In some examples, the RRC signaling (e.g., at 1502) may also include the condition for the adaptation, as described in connection with the adaptation indication 1126 of FIG. 11.

In some examples, at 1512, the UE may measure a remaining time budget, as described in connection with at least the measurement procedure 840 of FIG. 8, the determination procedure 1140 of FIG. 11, and/or the determination procedure 1340 of FIG. 13. The UE may then communicate (e.g., at 1516) with the network entity based on the adaptation of the multiple transmission or reception occasions in response to the remaining time budget meeting the condition, as described in connection with at least the communication 852 of FIG. 8, the communication 1152 of FIG. 11, and/or the communication 1352 of FIG. 13. The measurement, at 1512, may be performed by the resources selection component 198 of the apparatus 1604 of FIG. 16, as an example.

In some examples, the condition (e.g., at 1508) may include at least one of a time threshold, a delay parameter threshold, a first threshold number of PUSCH transmission occasions, a second threshold number of PDSCH reception occasions, a resource ID, a UE ID, a cell ID, a UE energy condition threshold, a network energy condition threshold, a power saving mode, a retransmission, an L1 or L2 priority of data, or a QoS for the data.

In some examples, the indication of the adaptable parameter (e.g., at 1508) may be comprised in an activation DCI indicating for the UE to start use of adapted transmission or reception occasions, as described in connection with at least the activation indicator 1132 and the DCI 1136 of FIG. 11. In some such examples, the activation DCI may also indicate at least one of a time adjustment or a frequency adjustment for the adaptation of the multiple transmission or reception occasions.

In some examples, at least one of the indication of the adaptable parameter or the condition for the adaptation (e.g., at 1508) may be comprised in at least one of a MAC-CE or an adjustment DCI, as described in connection with at least the activation indicator 1326 and the adaptation indication 1330 of FIG. 13.

In some examples, the RRC signaling (e.g., at 1502) may configure multiple CGs or multiple SPS grants, as described in connection with at least the multiple configurations 1122 of FIG. 11 and/or the multiple configurations 1322 of FIG. 13. Then, at 1504, the UE may receive at least one of a MAC-CE or an activation DCI, as described in connection with the second mechanism of FIG. 7 (e.g., a type 2 CG or an SPS grant) and/or the activation indicator 1326 of FIG. 13. In some examples, the MAC-CE and/or the activation DCI may include an activation of the CG or the SPS grant that indicates the multiple transmission or reception occasions (e.g., at 1506) and the condition (e.g., at 1508), as described in connection with at least the activation indicator 1326, the baseline size information 1328, and/or the adaptation indication 1330 of FIG. 13. The reception, at 1504, may be performed by the resources selection component 198 of the apparatus 1604 and/or the cellular RF transceiver 1622 or the one or more antennas 1680 of FIG. 16, as an example.

In some examples, the MAC-CE and/or the activation DCI (e.g., at 1504) may indicate a baseline size for the multiple transmission or reception occasions, as described in connection with at least the baseline size information 1328 of FIG. 13.

In some examples, the MAC-CE and/or the activation DCI may indicate a sequence of CGs or SPS grants, as described in connection with at least the pattern 1334 of FIG. 13, the first pattern 940 of FIG. 9C, and/or the second pattern 960 of FIG. 9D.

In some examples, the control information scheduling the multiple transmission or reception occasions (e.g., at 1506) may provide at least one parameter that is based on the condition, as described in connection with at least the table 900 of FIG. 9A, the table 920 of FIG. 9B, and/or the table 1220 of FIG. 12B.

In some examples, the adaptation (e.g., at 1508) may include one or more of: a different frequency allocation for the multiple transmission or reception occasions, a different time duration allocation for the multiple transmission or reception occasions, a different periodicity for the multiple transmission or reception occasions, or a different starting time for the multiple transmission or reception occasions, as described in connection with at least the adaptation procedure 844 of FIG. 8.

In some examples, the control information (e.g., at 1506) may include multiple conditions, and each condition may trigger a change to a different adaptation (e.g., at 1508) for the multiple transmission or reception occasions scheduled in the control information, as described in connection with at least the table 920 of FIG. 9B.

In some examples, the control information (e.g., at 1506) may indicate a period of time associated with the adaptation of the multiple transmission or reception occasions, as described in connection with at least the time periods 908 of FIG. 9A. In some such examples, at 1518, the UE may communicate with the network entity without the adaptation after the period of time, as described in connection with at least the communication 862 of FIG. 8. The communication, at 1518, may be performed by the resources selection component 198 of the apparatus 1604 and/or the cellular RF transceiver 1622 or the one or more antennas 1680 of FIG. 16.

In some examples, the control information (e.g., at 1506) may indicate a pattern of resources over time for use at each occasion of a set of the multiple transmission or reception occasions, as described in connection with at least the first pattern 940 of FIG. 9C, and/or the second pattern 960 of FIG. 9D.

In some examples, the pattern of resources may increase in at least one of a time domain or a frequency domain across the pattern, as described in connection with the second column 944 of FIG. 9C, and/or the resources 964 of FIG. 9D.

In some examples, the control information may indicate a resource identifier as a baseline resource for the pattern, and additional resources of the pattern may be based on the baseline resource and at least one of a defined rule or a configured parameter, as described in connection with at least the pattern 826 and the selection procedure 842 of FIG. 8.

Figure 16:
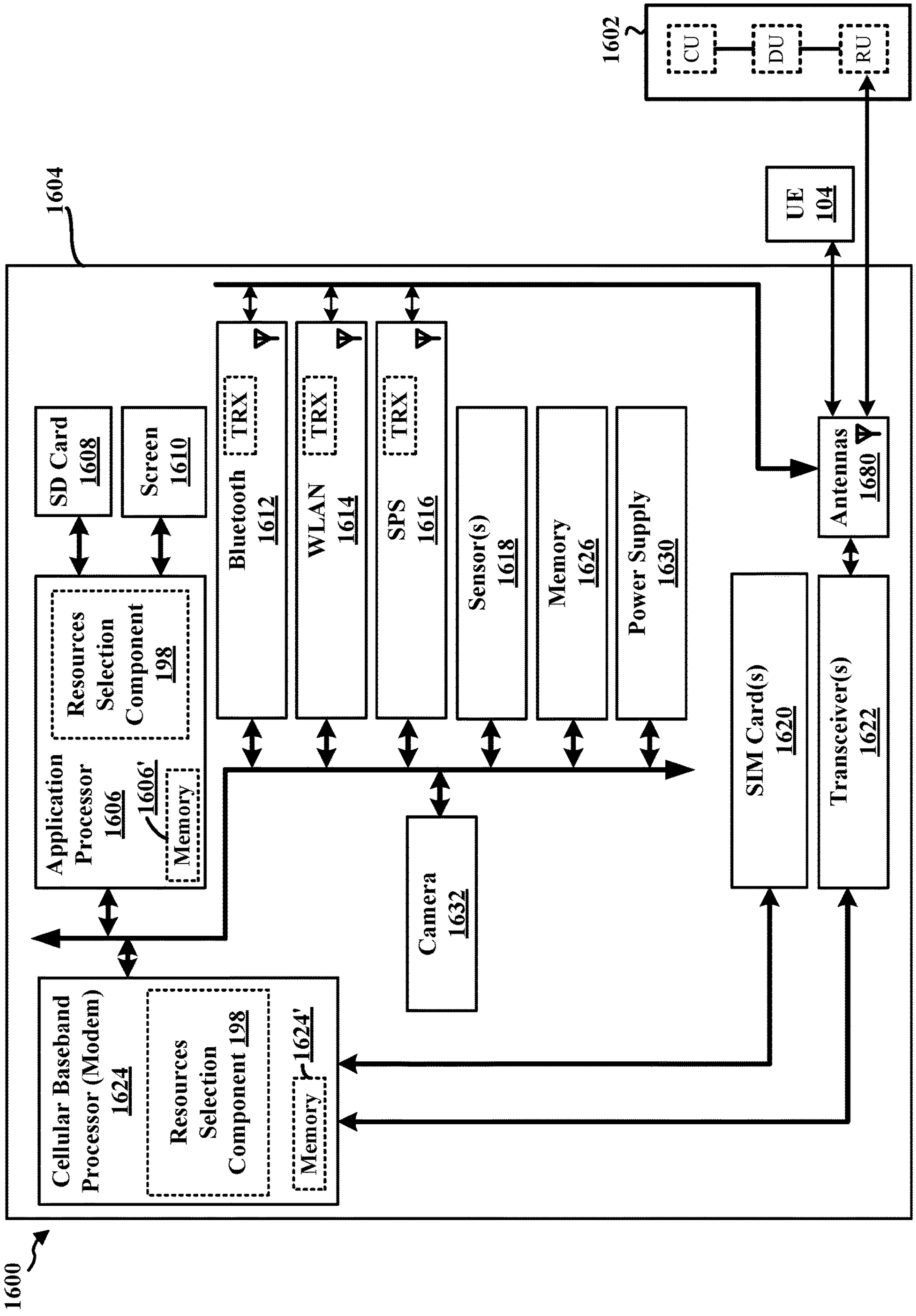
FIG. 16 is a diagram illustrating an example of a hardware implementation for an apparatus, in accordance with the teachings disclosed herein.

FIG. 16 is a diagram 1600 illustrating an example of a hardware implementation for an apparatus 1604. The apparatus 1604 may be a UE, a component of a UE, or may implement UE functionality. In some aspects, the apparatus 1604 may include a cellular baseband processor 1624 (also referred to as a modem) coupled to one or more transceivers (e.g., a cellular RF transceiver 1622). The cellular baseband processor 1624 may include on-chip memory 1624'. In some aspects, the apparatus 1604 may further include one or more subscriber identity modules (SIM) cards 1620 and an application processor 1606 coupled to a secure digital (SD) card 1608 and a screen 1610. The application processor 1606 may include on-chip memory 1606'. In some aspects, the apparatus 1604 may further include a Bluetooth module 1612, a WLAN module 1614, an SPS module 1616 (e.g., GNSS module), one or more sensor modules 1618 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1626, a power supply 1630, and/or a camera 1632. The Bluetooth module 1612, the WLAN module 1614, and the SPS module 1616 may include an on-chip transceiver (TRX) (or in some cases, just a receiver (RX)). The Bluetooth module 1612, the WLAN module 1614, and the SPS module 1616 may include their own dedicated antennas and/or utilize one or more antennas 1680 for communication. The cellular baseband processor 1624 communicates through transceiver(s) (e.g., the cellular RF transceiver 1622) via one or more antennas 1680 with the UE 104 and/or with an RU associated with a network entity 1602. The cellular baseband processor 1624 and the application processor 1606 may each include a computer-readable medium/memory, such as the on-chip memory 1624', and the on-chip memory 1606', respectively. The additional memory modules 1626 may also be considered a computer-readable medium/memory. Each computer-readable medium/memory (e.g., the on-chip memory 1624', the on-chip memory 1606', and/or the additional memory modules 1626) may be non-transitory. The cellular baseband processor 1624 and the application processor 1606 are each responsible for general processing, including the execution of software stored on the computer-readable medium/memory. The software, when executed by the cellular baseband processor 1624/application processor 1606, causes the cellular baseband processor 1624/application processor 1606 to perform the various functions described supra. The computer-readable medium/memory may also be used for storing data that is manipulated by the cellular baseband processor 1624/application processor 1606 when executing software. The cellular baseband processor 1624/application processor 1606 may be a component of the UE 350 and may include the memory 360 and/or at least one of the TX processor 368, the RX processor 356, and the controller/processor 359. In one configuration, the apparatus 1604 may be a processor chip (modem and/or application) and include just the cellular baseband processor 1624 and/or the application processor 1606, and in another configuration, the apparatus 1604 may be the entire UE (e.g., see the UE 350 of FIG. 3) and include the additional modules of the apparatus 1604.

As discussed supra, the resources selection component 198 may be configured to: receive, from a network entity, control information scheduling multiple transmission or reception occasions; receive at least one of an indication of an adaptable parameter or a condition for an adaptation of the multiple transmission or reception occasions; communicate with the network entity based on the multiple transmission or reception occasions; and communicate with the network entity based on the adaptation of the multiple transmission or reception occasions in response to an occurrence of the condition or reception of the indication of the adaptable parameter. In some aspects, the resources selection component 198 may be further configured to measure a remaining time budget, where the UE communicates with the network entity based on the indication of the adaptation of the multiple transmission or reception occasions in response to the remaining time budget meeting the condition.

In some aspects, the resources selection component 198 may be further configured to receive, in at least one of a MAC-CE or an activation DCI, an activation of the CG or the SPS grant that indicates the multiple transmission or reception occasions and the condition. In some aspects, the resources selection component 198 may be further configured to receive at least one of a MAC-CE or an activation DCI that indicates a sequence of CGs or SPS grants. In some aspects, the resources selection component 198 may be further configured to communicate with the network entity without the adaptation after the period of time.

The resources selection component 198 may be further configured to perform any of the aspects described in connection with the flowcharts of FIG. 14 or FIG. 15, and/or performed by the UE 804 in the communication flow 800 of FIG. 8, the UE 1104 in the communication flow 1100 of FIG. 11, and/or the UE 1304 in the communication flow 1300 of FIG. 13.

The resources selection component 198 may be within the cellular baseband processor 1624, the application processor 1606, or both the cellular baseband processor 1624 and the application processor 1606. The resources selection component 198 may be one or more hardware components specifically configured to carry out the stated processes/algorithm, implemented by one or more processors configured to perform the stated processes/algorithm, stored within a computer-readable medium for implementation by one or more processors, or some combination thereof.

As shown, the apparatus 1604 may include a variety of components configured for various functions. For example, the resources selection component 198 may include one or more hardware components that perform each of the blocks of the algorithm in the flowcharts of FIG. 14 and/or FIG. 15.

In one configuration, the apparatus 1604, and in particular the cellular baseband processor 1624 and/or the application processor 1606, may include means for receiving, from a network entity, control information scheduling multiple transmission or reception occasions. The example apparatus 1604 also includes means for receiving at least one of an indication of an adaptable parameter or a condition for an adaptation of the multiple transmission or reception occasions. The example apparatus 1604 also includes means for communicating with the network entity based on the multiple transmission or reception occasions. The example apparatus 1604 also includes means for communicating with the network entity based on the adaptation of the multiple transmission or reception occasions in response to an occurrence of the condition or reception of the indication of the adaptable parameter.

In another configuration, the example apparatus 1604 also includes means for measuring a remaining time budget, and where the UE communicates with the network entity based on the adaptation of the multiple transmission or reception occasions in response to the remaining time budget meeting the condition.

In another configuration, the example apparatus 1604 also includes means for receiving, in at least one of a MAC-CE or an activation DCI, an activation of the CG or the SPS grant that indicates the multiple transmission or reception occasions and the condition.

In another configuration, the example apparatus 1604 also includes means for receiving at least one of a MAC-CE or an activation DCI that indicates a sequence of CGs or SPS grants.

In another configuration, the example apparatus 1604 also includes means for communicating with the network entity without the adaptation after the period of time The means may be the resources selection component 198 of the apparatus 1604 configured to perform the functions recited by the means. As described supra, the apparatus 1604 may include the TX processor 368, the RX processor 356, and the controller/processor 359. As such, in one configuration, the means may be the TX processor 368, the RX processor 356, and/or the controller/processor 359 configured to perform the functions recited by the means.

Figure 17:
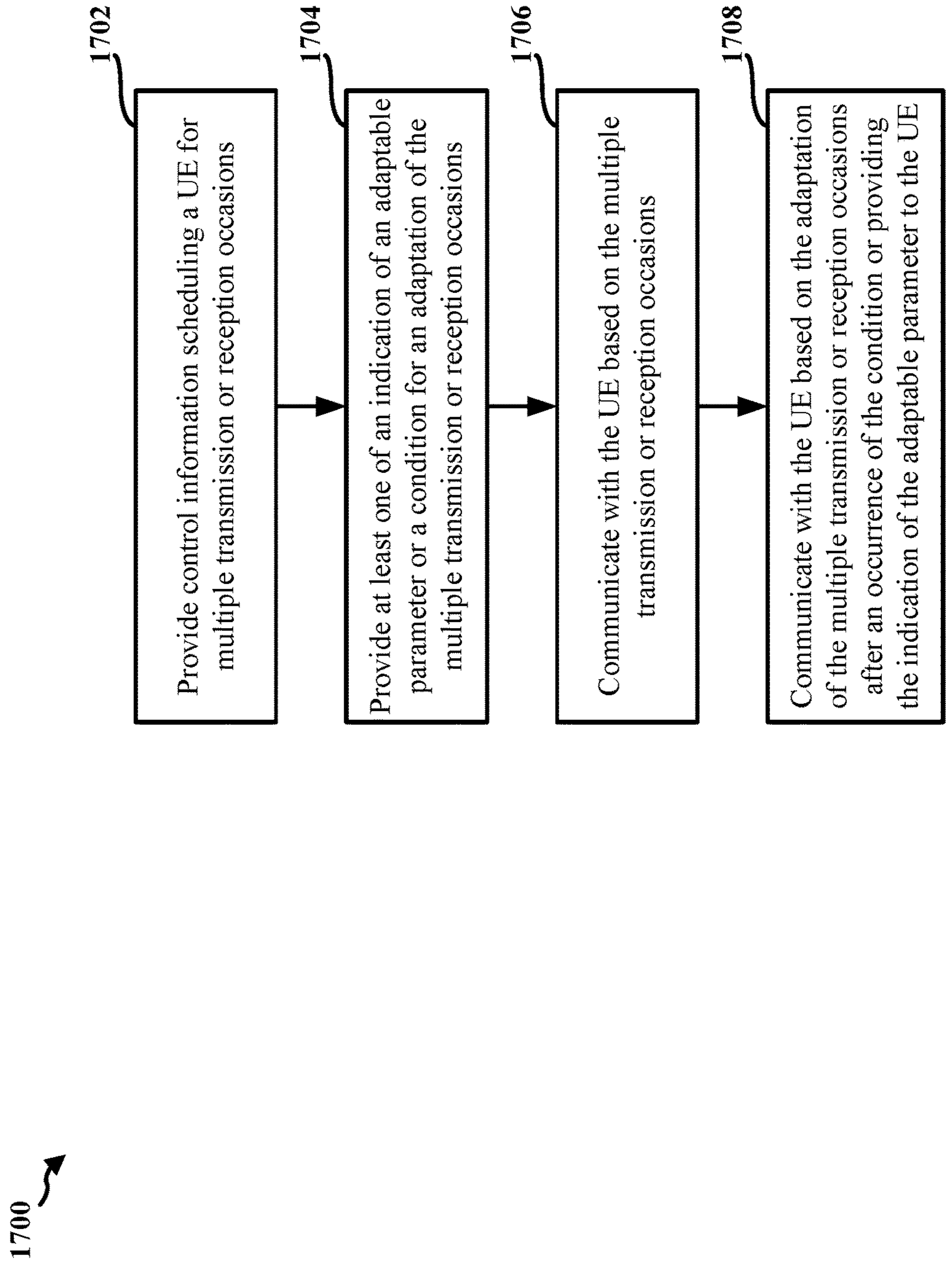
FIG. 17 is a flowchart of a method of wireless communication at a network entity, in accordance with the teachings disclosed herein.

FIG. 17 is a flowchart 1700 of a method of wireless communication. The method may be performed by a base station, a network entity, or a network node (e.g., the base station 102, the network entity 1902, the CU, the DU, and/or the RU). The method may facilitate improving communication performance by increasing resources for semi-static configured resources over time.

At 1702, the network node provides control information scheduling a UE for multiple transmission or reception occasions, as described in connection with at least the control information 1110, the CG configuration 1120, the multiple configurations 1122, and/or the activation indicator 1132 of FIG. 11, and/or the control information 1310, the resource configuration 1320 and/or the activation indicator 1326 of FIG. 13. The providing, at 1702, may be performed by the resources configuration component 199 of the network entity 1902 and/or one or more transceivers 1946 or antennas 1980 in FIG. 19, as an example.

At 1704, the network node provides at least one of an indication of an adaptable parameter or a condition for an adaptation of the multiple transmission or reception occasions, as described in connection with at least the condition 820 and/or the adaptable parameter 822 of FIG. 8, the adaptation indication 1126 of FIG. 11, and/or the adaptation indication 1330 of FIG. 13. The providing, at 1704, may be performed by the resources configuration component 199 of the network entity 1902 and/or the one or more transceivers 1946 or the antennas 1980 in FIG. 19, as an example.

At 1706, the network node communicates with the UE based on the multiple transmission or reception occasions, as described in connection with at least the communication 850 of FIG. 8, the communication 1130 of FIG. 11, and/or the communication 1332 of FIG. 13. The communication, at 1706, may be performed by the resources configuration component 199 of the network entity 1902 and/or the one or more transceivers 1946 or the antennas 1980 in FIG. 19, as an example.

At 1708, the network node communicates with the UE based on the adaptation of the multiple transmission or reception occasions after an occurrence of the condition or providing the indication of the adaptable parameter to the UE, as described in connection with at least the communication 852 of FIG. 8, the communication 1152 of FIG. 11, and/or the communication 1352 of FIG. 13. The communication, at 1708, may be performed by the resources configuration component 199 of the network entity 1902 and/or the one or more transceivers 1946 or the antennas 1980 in FIG. 19, as an example.

Figure 18:
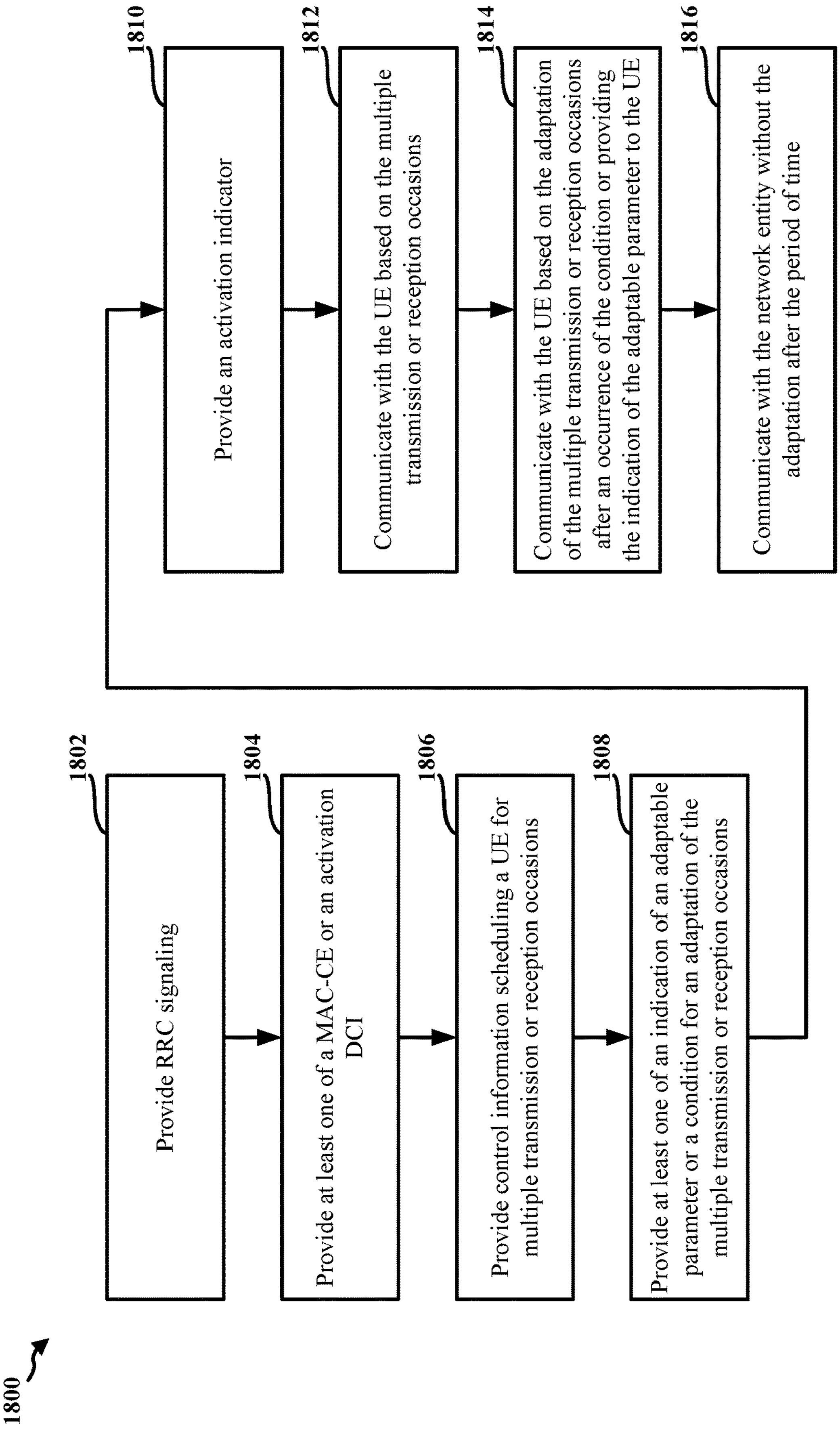
FIG. 18 is a flowchart of a method of wireless communication at a network entity, in accordance with the teachings disclosed herein.

FIG. 18 is a flowchart 1800 of a method of wireless communication. The method may be performed by a base station, a network entity, or a network node (e.g., the base station 102, the network entity 1902, the CU, the DU, and/or the RU). The method may facilitate improving communication performance by increasing resources for semi-static configured resources over time.

At 1806, the network node provides control information scheduling a UE for multiple transmission or reception occasions, as described in connection with at least the control information 1110, the CG configuration 1120, the multiple configurations 1122, and/or the activation indicator 1132 of FIG. 11, and/or the control information 1310, the resource configuration 1320 and/or the activation indicator 1326 of FIG. 13. The providing, at 1806, may be performed by the resources configuration component 199 of the network entity 1902 and/or one or more transceivers 1946 or antennas 1980 in FIG. 19, as an example.

At 1808, the network node provides at least one of an indication of an adaptable parameter or a condition for an adaptation of the multiple transmission or reception occasions, as described in connection with at least the condition 820 and/or the adaptable parameter 822 of FIG. 8, the adaptation indication 1126 of FIG. 11, and/or the adaptation indication 1330 of FIG. 13. The providing, at 1808, may be performed by the resources configuration component 199 of the network entity 1902 and/or the one or more transceivers 1946 or the antennas 1980 in FIG. 19, as an example.

At 1812, the network node communicates with the UE based on the multiple transmission or reception occasions, as described in connection with at least the communication 850 of FIG. 8, the communication 1130 of FIG. 11, and/or the communication 1332 of FIG. 13. The communication, at 1812, may be performed by the resources configuration component 199 of the network entity 1902 and/or the one or more transceivers 1946 or the antennas 1980 in FIG. 19, as an example.

At 1814, the network node communicates with the UE based on the adaptation of the multiple transmission or reception occasions after an occurrence of the condition or providing the indication of the adaptable parameter to the UE, as described in connection with at least the communication 852 of FIG. 8, the communication 1152 of FIG. 11, and/or the communication 1352 of FIG. 13. The communication, at 1814, may be performed by the resources configuration component 199 of the network entity 1902 and/or the one or more transceivers 1946 or the antennas 1980 in FIG. 19, as an example.

In some examples, the network node may provide, at 1810, an activation indicator, as described in connection with at least the CG configuration 1120 and/or the activation indicator 1132 of FIG. 11, and/or the activation indicator 1326 of FIG. 13. In some examples, the activation indicator may comprise control information, such as a single DCI, that allocates resources for multiple PUSCH transmissions or multiple PDSCH receptions. In some examples, the single DCI may also include the condition for the adaptation (e.g., at 1810), as described in connection with at least the CG configuration 1120 of FIG. 11 and/or the resource configuration 1320 of FIG. 13. The providing, at 1810, may be performed by the resources configuration component 199 of the network entity 1902 and/or the one or more transceivers 1946 or the antennas 1980 in FIG. 19, as an example In some examples, the control information, at 1806, may configure a CG or an SPS grant indicated in RRC signaling. For example, at 1802, the network node may provide RRC signaling, as described in connection with at least the RRC signaling 710 of FIG. 7, the control information 1110 of FIG. 11, and/or the control information 1310 of FIG. 13. The providing, at 1802, may be performed by the resources configuration component 199 of the network entity 1902 and/or the one or more transceivers 1946 or the antennas 1980 in FIG. 19, as an example.

In some examples, the CG or the SPS grant may be active based on the RRC signaling without a separate activation message and the condition may be based on a remaining time budget for communication at the UE, as described in connection with the type 1 CG, e.g., at least the example first mechanism of FIG. 7 (e.g., a type 1 CG) and/or the CG configuration 1120 of FIG. 11. The network node may then communicate (e.g., at 1814) with the UE based on the adaptation of the multiple transmission or reception occasions or after the remaining time budget meeting the condition, as described in connection with at least the communication 852 of FIG. 8, the communication 1152 of FIG. 11, and/or the communication 1352 of FIG. 13.

In some examples, the condition (e.g., at 1808) may include at least one of a time threshold, a delay parameter threshold, a first threshold number of PUSCH transmission occasions, a second threshold number of PDSCH reception occasions, a resource ID, a UE ID, a cell ID, a UE energy condition threshold, a network energy condition threshold, a power saving mode, a retransmission, an L1 or L2 priority of data, or a QoS for the data.

In some examples, the indication of the adaptable parameter (e.g., at 1808) may be comprised in an activation DCI indicating for the UE to start use of adapted transmission or reception occasions, as described in connection with at least the activation indicator 1132 and the DCI 1136 of FIG. 11. In some such examples, the activation DCI may also indicate at least one of a time adjustment or a frequency adjustment for the adaptation of the multiple transmission or reception occasions.

In some examples, at least one of the indication of the adaptable parameter or the condition for the adaptation (e.g., at 1808) may be comprised in at least one of a MAC-CE or an adjustment DCI, as described in connection with at least the activation indicator 1326 and the adaptation indication 1330 of FIG. 13.

In some examples, the RRC signaling (e.g., at 1802) may configure multiple CGs or multiple SPS grants, as described in connection with at least the multiple configurations 1122 of FIG. 11 and/or the multiple configurations 1322 of FIG. 13. Then, at 1804, the network node may provide at least one of a MAC-CE or an activation DCI, as described in connection with the second mechanism of FIG. 7 (e.g., a type 2 CG or an SPS grant) and/or the activation indicator 1326 of FIG. 13. In some examples, the MAC-CE and/or the activation DCI may include an activation of the CG or the SPS grant that indicates the multiple transmission or reception occasions (e.g., at 1806) and the condition (e.g., at 1808), as described in connection with at least the activation indicator 1326, the baseline size information 1328, and/or the adaptation indication 1330 of FIG. 13. The providing, at 1804, may be performed by the resources configuration component 199 of the network entity 1902 and/or the one or more transceivers 1946 or the antennas 1980 in FIG. 19, as an example.

In some examples, the MAC-CE and/or the activation DCI (e.g., at 1804) may indicate a baseline size for the multiple transmission or reception occasions, as described in connection with at least the baseline size information 1328 of FIG. 13.

In some examples, the MAC-CE and/or the activation DCI (e.g., at 1804) may indicate a sequence of CGs or SPS grants, as described in connection with at least the pattern 1334 of FIG. 13, the first pattern 940 of FIG. 9C, and/or the second pattern 960 of FIG. 9D.

In some examples, the control information scheduling the multiple transmission or reception occasions (e.g., at 1806) may provide at least one parameter that is based on the condition, as described in connection with at least the table 900 of FIG. 9A, the table 920 of FIG. 9B, and/or the table 1220 of FIG. 12B.

In some examples, the adaptation (e.g., at 1808) may include one or more of: a different frequency allocation for the multiple transmission or reception occasions, a different time duration allocation for the multiple transmission or reception occasions, a different periodicity for the multiple transmission or reception occasions, or a different starting time for the multiple transmission or reception occasions, as described in connection with at least the adaptation procedure 844 of FIG. 8.

In some examples, the control information (e.g., at 1806) may include multiple conditions, and each condition may trigger a change to a different adaptation (e.g., at 1808) for the multiple transmission or reception occasions scheduled in the control information, as described in connection with at least the table 920 of FIG. 9B.

In some examples, the control information (e.g., at 1806) may indicate a period of time associated with the adaptation of the multiple transmission or reception occasions, as described in connection with at least the time periods 908 of FIG. 9A. In some such examples, at 1816, the network node may communicate with the UE without the adaptation after the period of time, as described in connection with at least the communication 862 of FIG. 8. The communication, at 1816, may be performed by the resources configuration component 199 of the network entity 1902 and/or the one or more transceivers 1946 or the antennas 1980 in FIG. 19, as an example.

In some examples, the control information (e.g., at 1806) may indicate a pattern of resources over time for use at each occasion of a set of the multiple transmission or reception occasions, as described in connection with at least the first pattern 940 of FIG. 9C, and/or the second pattern 960 of FIG. 9D. In some examples, the pattern of resources may increase in at least one of a time domain or a frequency domain across the pattern, as described in connection with the second column 944 of FIG. 9C, and/or the resources 964 of FIG. 9D. In some examples, the control information may indicate a resource identifier as a baseline resource for the pattern, and additional resources of the pattern may be based on the baseline resource and at least one of a defined rule or a configured parameter, as described in connection with at least the pattern 826 and the selection procedure 842 of FIG. 8.

Figure 19:
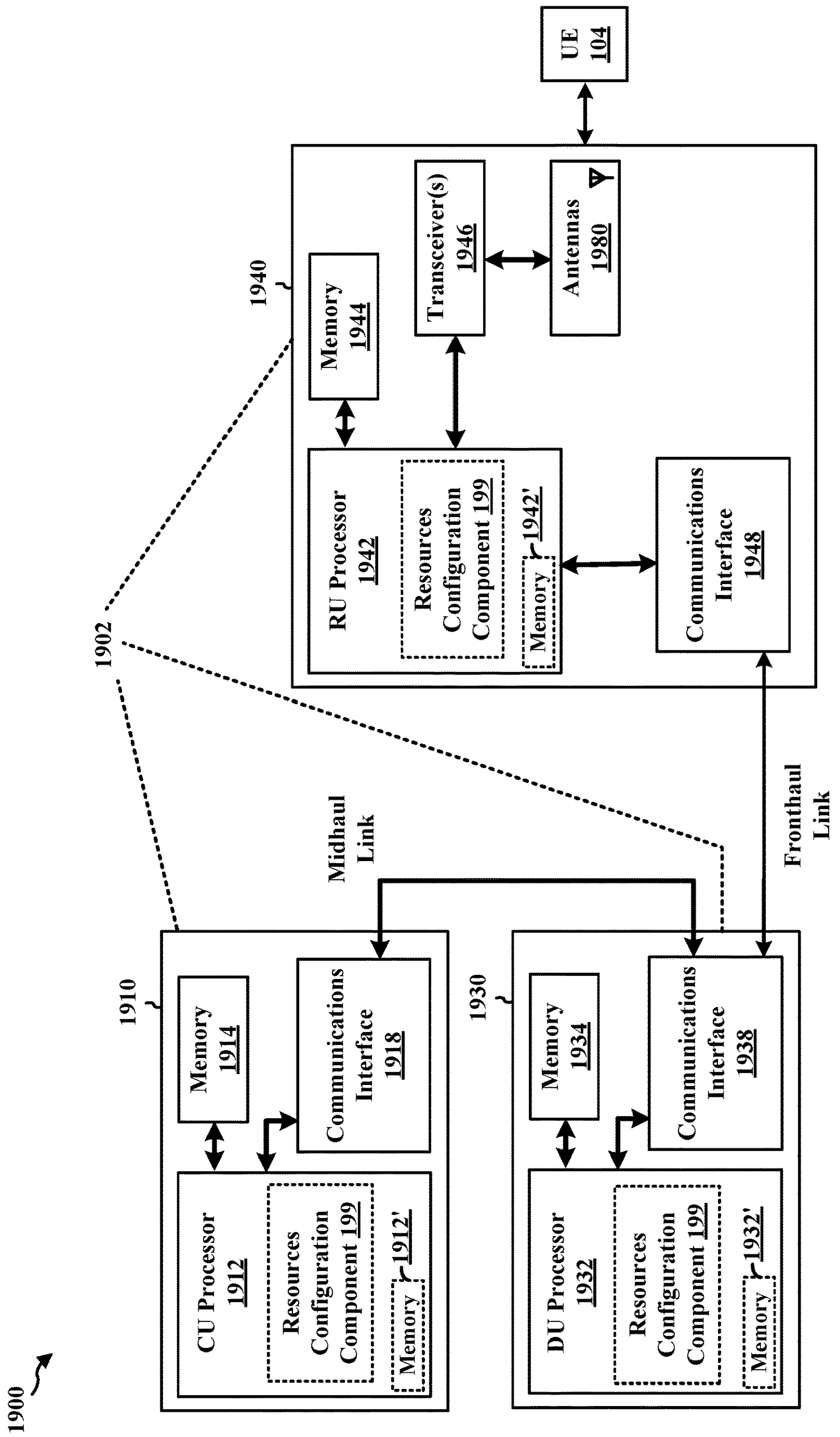
FIG. 19 is a diagram illustrating an example of a hardware implementation for a network entity, in accordance with the teachings disclosed herein.

FIG. 19 is a diagram 1900 illustrating an example of a hardware implementation for a network entity 1902. The network entity 1902 may be a BS, a component of a BS, or may implement BS functionality. The network entity 1902 may include at least one of a CU 1910, a DU 1930, or an RU 1940. For example, depending on the layer functionality handled by the resources configuration component 199, the network entity 1902 may include the CU 1910; both the CU 1910 and the DU 1930; each of the CU 1910, the DU 1930, and the RU 1940; the DU 1930; both the DU 1930 and the RU 1940; or the RU 1940. The CU 1910 may include a CU processor 1912. The CU processor 1912 may include on-chip memory 1912'. In some aspects, may further include additional memory modules 1914 and a communications interface 1918. The CU 1910 communicates with the DU 1930 through a midhaul link, such as an F1 interface. The DU 1930 may include a DU processor 1932. The DU processor 1932 may include on-chip memory 1932'. In some aspects, the DU 1930 may further include additional memory modules 1934 and a communications interface 1938. The DU 1930 communicates with the RU 1940 through a fronthaul link. The RU 1940 may include an RU processor 1942. The RU processor 1942 may include on-chip memory 1942'. In some aspects, the RU 1940 may further include additional memory modules 1944, one or more transceivers 1946, antennas 1980, and a communications interface 1948. The RU 1940 communicates with the UE 104. The on-chip memories (e.g., the on-chip memory 1912', the on-chip memory 1932', and/or the on-chip memory 1942') and/or the additional memory modules (e.g., the additional memory modules 1914, the additional memory modules 1934, and/or the additional memory modules 1944) may each be considered a computer-readable medium/memory. Each computer-readable medium/memory may be non-transitory. Each of the CU processor 1912, the DU processor 1932, the RU processor 1942 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the resources configuration component 199 may be configured to: provide control information scheduling a UE for multiple transmission or reception occasions; provide at least one of an indication of an adaptable parameter or a condition for an adaptation of the multiple transmission or reception occasions; communicate with the UE based on the multiple transmission or reception occasions; and communicate with the UE based on the adaptation of the multiple transmission or reception occasions after an occurrence of the condition or providing the indication of the adaptable parameter to the UE.

In some aspects, the resources configuration component 199 may be further configured to provide, in at least one of a MAC-CE or an activation DCI, an activation of the CG or the SPS that indicates the multiple transmission or reception occasions and the condition. In some aspects, the resources configuration component 199 may be further configured to provide at least one of a MAC-CE or an activation DCI that indicates a sequence of CGs or SPSs. In some aspects, the resources configuration component 199 may be further configured to communicate with the UE without the adaptation after the period of time.

The resources configuration component 199 may be further configured to perform any of the aspects described in connection with the flowcharts of FIG. 17 or FIG. 18, and/or performed by the network entity 802 in the communication flow 800 of FIG. 8, the network entity 1102 in the communication flow 1100 of FIG. 11, and/or the network entity 1302 in the communication flow 1300 of FIG. 13.

The resources configuration component 199 may be within one or more processors of one or more of the CU 1910, DU 1930, and the RU 1940. The resources configuration component 199 may be one or more hardware components specifically configured to carry out the stated processes/algorithm, implemented by one or more processors configured to perform the stated processes/algorithm, stored within a computer-readable medium for implementation by one or more processors, or some combination thereof.

As shown, the network entity 1902 may include a variety of components configured for various functions. For example, the resources configuration component 199 may include one or more hardware components that perform each of the blocks of the algorithm in the flowcharts of FIG. 17 and/or FIG. 18.

In one configuration, the network entity 1902 may include means for providing control information scheduling a UE for multiple transmission or reception occasions. The example network entity 1902 also includes means for providing at least one of an indication of an adaptable parameter or a condition for an adaptation of the multiple transmission or reception occasions. The example network entity 1902 also includes means for communicating with the UE based on the multiple transmission or reception occasions. The example network entity 1902 also includes means for communicating with the UE based on the adaptation of the multiple transmission or reception occasions after an occurrence of the condition or providing the indication of the adaptable parameter to the UE.

In another configuration, the example network entity 1902 also includes means for providing, in at least one of a MAC-CE or an activation DCI, an activation of the CG or the SPS grant that indicates the multiple transmission or reception occasions and the condition.

In another configuration, the example network entity 1902 also includes means for providing at least one of a MAC-CE or an activation DCI that indicates a sequence of CGs or SPS grants.

In another configuration, the example network entity 1902 also includes means for communicating with the UE without the adaptation after the period of time The means may be the resources configuration component 199 of the network entity 1902 configured to perform the functions recited by the means. As described supra, the network entity 1902 may include the TX processor 316, the RX processor 370, and the controller/processor 375. As such, in one configuration, the means may be the TX processor 316, the RX processor 370, and/or the controller/processor 375 configured to perform the functions recited by the means.

Aspects disclosed herein facilitate increasing resources, such as multiple transmission or reception occasions, over time, for example, as the remaining packet delay time decreases. The increase in the resources may be based on at least one of a condition and an adaptable parameter.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: receiving, from a network entity, control information scheduling multiple transmission or reception occasions; receiving at least one of an indication of an adaptable parameter or a condition for an adaptation of the multiple transmission or reception occasions; communicating with the network entity based on the multiple transmission or reception occasions; and communicating with the network entity based on the adaptation of the multiple transmission or reception occasions in response to an occurrence of the condition or reception of the indication of the adaptable parameter.

Aspect 2 is the method of aspect 1, further including that the control information comprises a single DCI that allocates resources for multiple PUSCH transmissions or multiple PDSCH receptions and further includes the condition for the adaptation.

Aspect 3 is the method of any of aspects 1 and 2, further including that the control information configures a CG or an SPS grant indicated in RRC signaling.

Aspect 4 is the method of any of aspects 1 to 3, further including that the CG or the SPS grant are active based on the RRC signaling without a separate activation message, where the RRC signaling further includes the condition for the adaptation, the method further comprising: measuring a remaining time budget, and where the UE communicates with the network entity based on the adaptation of the multiple transmission or reception occasions in response to the remaining time budget meeting the condition.

Aspect 5 is the method of any of aspects 1 to 4, further including that the condition comprises at least one of: a time threshold, a delay parameter threshold, a first threshold number of PUSCH transmission occasions, a second threshold number of PDSCH reception occasions, a resource ID, a UE ID, a cell ID, a UE energy condition threshold, a network energy condition threshold, a power saving mode, a retransmission, an L1 or L2 priority of data, or a QoS for the data.

Aspect 6 is the method of any of aspects 1 to 5, further including that the indication of the adaptable parameter is included in an activation DCI indicating for the UE to start use of adapted transmission or reception occasions.

Aspect 7 is the method of any of aspects 1 to 6, further including that the activation DCI further indicates at least one of a time adjustment or a frequency adjustment for the adaptation of the multiple transmission or reception occasions.

Aspect 8 is the method of any of aspects 1 to 7, further including that at least one of the indication of the adaptable parameter or the condition for the adaptation is comprised in at least one of a MAC-CE or an adjustment DCI.

Aspect 9 is the method of any of aspects 1 to 3, further including that the RRC signaling configures multiple CGs or multiple SPS grants, the method further comprising: receiving, in at least one of a MAC-CE or an activation DCI, an activation of the CG or the SPS grant that indicates the multiple transmission or reception occasions and the condition.

Aspect 10 is the method of any of aspects 1 to 3 and 9, further including that the MAC-CE or the activation DCI indicates a baseline size for the multiple transmission or reception occasions.

Aspect 11 is the method of any of aspects 1 to 10, further including that comprising: receiving at least one of a MAC-CE or an activation DCI that indicates a sequence of CGs or SPS grants.

Aspect 12 is the method of any of aspects 1 to 11, further including that the control information scheduling the multiple transmission or reception occasions provides at least one parameter that is based on the condition.

Aspect 13 is the method of any of aspects 1 to 12, further including that the adaptation includes one or more of: a different frequency allocation for the multiple transmission or reception occasions, a different time duration allocation for the multiple transmission or reception occasions, a different periodicity for the multiple transmission or reception occasions, or a different starting time for the multiple transmission or reception occasions.

Aspect 14 is the method of any of aspects 1 to 13, further including that the control information includes multiple conditions, each condition triggering a change to a different adaptation for the multiple transmission or reception occasions scheduled in the control information.

Aspect 15 is the method of any of aspects 1 to 14, further including that the control information indicates a period of time associated with the adaptation of the multiple transmission or reception occasions, the method further comprising: communicating with the network entity without the adaptation after the period of time.

Aspect 16 is the method of any of aspects 1 to 15, further including that the control information indicates a pattern of resources over time for use at each occasion of a set of the multiple transmission or reception occasions.

Aspect 17 is the method of any of aspects 1 to 16, further including that the pattern of resources increases in at least one of a time domain or a frequency domain across the pattern.

Aspect 18 is the method of any of aspects 1 to 17, further including that the control information indicates a resource identifier as a baseline resource for the pattern, and additional resources of the pattern are based on the baseline resource and at least one of a defined rule or a configured parameter.

Aspect 19 is an apparatus for wireless communication at a UE including at least one processor coupled to a memory and configured to implement any of aspects 1 to 18.

In aspect 20, the apparatus of aspect 19 further includes at least one antenna coupled to the at least one processor.

In aspect 21, the apparatus of aspect 19 or 20 further includes a transceiver coupled to the at least one processor.

Aspect 22 is an apparatus for wireless communication including means for implementing any of aspects 1 to 18.

In aspect 23, the apparatus of aspect 22 further includes at least one antenna coupled to the means to perform the method of any of aspects 1 to 18.

In aspect 24, the apparatus of aspect 22 or 23 further includes a transceiver coupled to the means to perform the method of any of aspects 1 to 18.

Aspect 25 is a non-transitory computer-readable storage medium storing computer executable code, where the code, when executed, causes a processor to implement any of aspects 1 to 18.

Aspect 26 is a method of wireless communication at a network entity, including: providing control information scheduling a UE for multiple transmission or reception occasions; providing at least one of an indication of an adaptable parameter or a condition for an adaptation of the multiple transmission or reception occasions; communicating with the UE based on the multiple transmission or reception occasions; and communicating with the UE based on the adaptation of the multiple transmission or reception occasions after an occurrence of the condition or providing the indication of the adaptable parameter to the UE.

Aspect 27 is the method of aspect 26, further including that the control information comprises a single DCI that allocates resources for multiple PUSCH transmissions or multiple PDSCH receptions and further includes the condition for the adaptation.

Aspect 28 is the method of any of aspects 26 and 27, further including that the control information configures a CG or an SPS grant indicated in RRC signaling.

Aspect 29 is the method of any of aspects 26 to 28, further including that the CG or the SPS grant are active based on the RRC signaling without a separate activation message, and the condition is based on a remaining time budget for communication at the UE.

Aspect 30 is the method of any of aspects 26 to 29, further including that the condition comprises at least one of: a time threshold, a delay parameter threshold, a first threshold number of PUSCH transmission occasions, a second threshold number of PDSCH reception occasions, a ID, a UE ID, a cell ID, a UE energy condition threshold, a network energy condition threshold, a power saving mode, a retransmission, an L1 or L2 priority of data, or a QoS for the data.

Aspect 31 is the method of any of aspects 26 to 30, further including that the adaptable parameter is included in an activation DCI indicating for the UE to start use of adapted transmission or reception occasions.

Aspect 32 is the method of any of aspects 26 to 31, further including that the activation DCI further indicates at least one of a time adjustment or a frequency adjustment for the adaptation of the multiple transmission or reception occasions.

Aspect 33 is the method of any of aspects 26 to 32, further including that at least one of the indication of the adaptable parameter or the condition for the adaptation is comprised in at least one of a MAC-CE or an adjustment DCI.

Aspect 34 is the method of any of aspects 26 to 33, further including that the RRC signaling configures multiple CGs or multiple SPS grants, the method further comprising: providing, in at least one of a MAC-E or an activation DCI, an activation of the CG or the SPS grant that indicates the multiple transmission or reception occasions and the condition.

Aspect 35 is the method of any of aspects 26 to 28 and 34, further including that the MAC-CE or the activation DCI indicates a baseline size for the multiple transmission or reception occasions.

Aspect 36 is the method of any of aspects 26 to 28, 34 and 35, further including: providing at least one of a MAC-CE or an activation DCI that indicates a sequence of CGs or SPS grants.

Aspect 37 is the method of any of aspects 26 to 36, further including that the control information scheduling the multiple transmission or reception occasions provides at least one parameter that is based on the condition.

Aspect 38 is the method of any of aspects 26 to 37, further including that the adaptation includes one or more of: a different frequency allocation for the multiple transmission or reception occasions, a different time duration allocation for the multiple transmission or reception occasions, a different periodicity for the multiple transmission or reception occasions, or a different starting time for the multiple transmission or reception occasions.

Aspect 39 is the method of any of aspects 26 to 38, further including that the control information includes multiple conditions, each condition triggering a change to a different adaptation for the multiple transmission or reception occasions scheduled in the control information.

Aspect 40 is the method of any of aspects 26 to 39, further including that the control information further indicates a period of time associated with the adaptation of the multiple transmission or reception occasions, the method further comprising: communicating with the UE without the adaptation after the period of time.

Aspect 41 is the method of any of aspects 26 to 40, further including that the control information indicates a pattern of resources over time for use at each occasion of a set of the multiple transmission or reception occasions.

Aspect 42 is the method of any of aspects 26 to 41, further including that the pattern of resources increases in at least one of a time domain or a frequency domain across the pattern.

Aspect 43 is the method of any of aspects 26 to 42, further including that the control information indicates a resource identifier as a baseline resource for the pattern, and additional resources of the pattern are based on the baseline resource and at least one of a defined rule or a configured parameter.

Aspect 44 is an apparatus for wireless communication at a network entity including at least one processor coupled to a memory and configured to implement any of aspects 26 to 43.

In aspect 45, the apparatus of aspect 44 further includes at least one antenna coupled to the at least one processor.

In aspect 46, the apparatus of aspect 44 or 45 further includes a transceiver coupled to the at least one processor.

Aspect 47 is an apparatus for wireless communication including means for implementing any of aspects 26 to 43.

In aspect 48, the apparatus of aspect 47 further includes at least one antenna coupled to the means to perform the method of any of aspects 26 to 43.

In aspect 49, the apparatus of aspect 47 or 48 further includes a transceiver coupled to the means to perform the method of any of aspects 26 to 43.

Aspect 50 is a non-transitory computer-readable storage medium storing computer executable code, where the code, when executed, causes a processor to implement any of aspects 26 to 43.

What is claimed is:

1. An apparatus for wireless communication at a user equipment (UE), comprising:

memory; and at least one processor coupled to the memory, the at least one processor configured to:

receive, from a network entity, control information scheduling multiple transmission or reception occasions, wherein the control information allocates an initial amount of resources for the multiple transmission or reception occasions, wherein the initial amount of resources comprises a first amount of resources in a time domain and a second amount of resources in a frequency domain;

receive, for an adaptation of the initial amount of resources for an occasion of the multiple transmission or reception occasions, at least one of an indication of a value of an adaptable parameter or a condition for the adaptation;

communicate with the network entity based on the initial amount of resources for the multiple transmission or reception occasions; and communicate with the network entity based on the adaptation of the initial amount of resources for the occasion of the multiple transmission or reception occasions in response to an occurrence of the condition or reception of the indication of the value of the adaptable parameter, wherein the adaptation of the initial amount of resources is associated with adapted resources that comprise at least one of a third amount of resources in the time domain that is different from the first amount or a fourth amount of resources in the frequency domain that is different from the second amount.

2. The apparatus of claim 1, further comprising:

at least one transceiver coupled to the at least one processor, wherein the at least one processor is configured to receive the control information via the at least one transceiver, the control information comprising a single downlink control information (DCI) that allocates the initial amount of resources for multiple physical uplink shared channel (PUSCH) transmissions or multiple physical downlink shared channel (PDSCH) receptions and further includes the condition for the adaptation.

3. The apparatus of claim 1, wherein the control information configures a configured grant (CG) or a semi-persistent scheduling (SPS) grant indicated in radio resource control (RRC) signaling.

4. The apparatus of claim 3, wherein the CG or the SPS grant are active based on the RRC signaling without a separate activation message, wherein the RRC signaling further includes the condition for the adaptation, wherein the condition is a time-based threshold condition, and wherein the at least one processor is further configured to:

measure a remaining time budget, wherein to communicate with the network entity based on the adaptation of the initial amount of resources, the at least one processor is configured to communicate with the network entity based on the adaptation of the initial amount of resources in response to the remaining time budget meeting the time-based threshold condition.

5. The apparatus of claim 4, wherein additional conditions comprise at least one of:

a time threshold, a delay parameter threshold, a first threshold number of physical uplink shared channel (PUSCH) transmission occasions, a second threshold number of physical downlink shared channel (PDSCH) reception occasions, a resource identifier (ID), a UE ID, a cell ID, a UE energy condition threshold, a network energy condition threshold, a power saving mode, a retransmission, a layer 1 (L1) or layer 2 (L2) priority of data, or a quality of service (QoS) for the data.

6. The apparatus of claim 4, wherein the indication of the value of the adaptable parameter is included in an activation downlink control information (DCI) indicating for the UE to start use of adapted transmission or reception occasions.

7. The apparatus of claim 6, wherein the value of the adaptable parameter included in the activation DCI further indicates at least one of a first adaptation of the first amount of resources in the time domain or a second adaptation of the second amount of resources in the frequency domain for the adaptation of the initial amount of resources for the occasion of the multiple transmission or reception occasions.

8. The apparatus of claim 3, wherein at least one of the indication of the value of the adaptable parameter or the condition for the adaptation is comprised in at least one of a medium access control-control element (MAC-CE) or an adjustment DCI.

9. The apparatus of claim 3, wherein the RRC signaling configures multiple CGs or multiple SPS grants, and wherein the at least one processor is further configured to:

receive, in at least one of a medium access control-control element (MAC-CE) or an activation DCI, an activation of the CG or the SPS grant that indicates the multiple transmission or reception occasions and the condition.

10. The apparatus of claim 9, wherein the MAC-CE or the activation DCI indicates the initial amount of resources as a baseline size for the multiple transmission or reception occasions.

11. The apparatus of claim 3, further comprising:

at least one antenna coupled to the at least one processor, wherein the at least one processor is further configured to:

receive at least one of a medium access control-control element (MAC-CE) or an activation DCI that indicates a sequence of CGs or SPS grants.

12. The apparatus of claim 1, wherein the control information scheduling the multiple transmission or reception occasions provides at least one parameter that is based on the condition.

13. The apparatus of claim 1, wherein the control information includes multiple conditions, each condition triggering a change to a different adaptation for one or more occasions of the multiple transmission or reception occasions scheduled in the control information.

14. The apparatus of claim 1, wherein the control information further indicates a period of time associated with the adaptation of the initial amount of resources for the occasion the multiple transmission or reception occasions, and the at least one processor is further configured to:

communicate with the network entity without the adaptation after the period of time.

15. The apparatus of claim 1, wherein the control information further indicates a pattern of resources over time, wherein the pattern indicates the resources for each occasion of a set of the multiple transmission or reception occasions.

16. The apparatus of claim 15, wherein the pattern of resources is a pattern of increasing resources over time, wherein the increasing resources comprise increasing resources in at least one of the time domain or the frequency domain.

17. The apparatus of claim 15, wherein the control information further indicates the initial amount of resources using a resource identifier, wherein the initial amount of resources is indicated as a baseline resource for the pattern, and additional resources of the pattern are based on the baseline resource and at least one of a defined rule or a configured parameter.

18. The apparatus of claim 1, wherein the at least one processor is further configured to perform the adaptation of the initial amount of resources by switching from a first resource configuration to a second resource configuration, wherein the second resource configuration is associated with a larger amount of resources than the first resource configuration.

19. An apparatus for wireless communication at a network node, comprising:

memory; and at least one processor coupled to the memory, the at least one processor configured to:

provide control information scheduling a user equipment (UE) for multiple transmission or reception occasions, wherein the control information allocates an initial amount of resources for the multiple transmission or reception occasions, wherein the initial amount of resources comprises a first amount of resources in a time domain and a second amount of resources in a frequency domain;

provide, for an adaptation of the initial amount of resources for an occasion of the multiple transmission or reception occasions, at least one of an indication of a value of an adaptable parameter or a condition for the adaptation;

communicate with the UE based on the initial amount of resources for the multiple transmission or reception occasions; and communicate with the UE based on the adaptation of the initial amount of resources for the occasion of the multiple transmission or reception occasions after an occurrence of the condition or providing the indication of the value of the adaptable parameter to the UE, wherein the adaptation of the initial amount of resources is associated with adapted resources that comprise at least one of a third amount of resources in the time domain that is different from the first amount or a fourth amount of resources in the frequency domain that is different from the second amount.

20. The apparatus of claim 19, further comprising:

at least one transceiver coupled to the at least one processor, wherein the at least one processor is configured to transmit the control information via the at least one transceiver, the control information comprising a single DCI that allocates the initial amount of resources for multiple physical uplink shared channel (PUSCH) transmissions or multiple physical downlink shared channel (PDSCH) receptions and further includes the condition for the adaptation.

21. The apparatus of claim 19, wherein the control information configures a configured grant (CG) or a semi-persistent scheduling (SPS) grant indicated in radio resource control (RRC) signaling.

22. The apparatus of claim 21, wherein the CG or the SPS grant are active based on the RRC signaling without a separate activation message, wherein the condition is a time-based threshold condition that is based on a remaining time budget for communication at the UE.

23. The apparatus of claim 22, wherein additional conditions comprise at least one of:

a time threshold,
a delay parameter threshold,
a first threshold number of physical uplink shared channel (PUSCH) transmission occasions,
a second threshold number of physical downlink shared channel (PDSCH) reception occasions,
a resource identifier (ID),
a UE ID,
a cell ID,
a UE energy condition threshold,
a network energy condition threshold,
a power saving mode,
a retransmission,
a layer 1 (L1) or layer 2 (L2) priority of data, or
a quality of service (QoS) for the data.

24. The apparatus of claim 22, wherein the indication of the value of the adaptable parameter is included in an activation downlink control information (DCI) indicating for the UE to start use of adapted transmission or reception occasions.

25. The apparatus of claim 21, wherein the RRC signaling configures multiple CGs or multiple SPS grants, and the apparatus further comprising:

at least one antenna coupled to the at least one processor, wherein the at least one processor is further configured to:

provide, in at least one of a medium access control-control element (MAC-CE) or an activation DCI, an activation of the CG or the SPS grant that indicates the multiple transmission or reception occasions and the condition.

26. The apparatus of claim 25, wherein the MAC-CE or the activation DCI indicates the initial amount of resources as a baseline size for the multiple transmission or reception occasions.

27. The apparatus of claim 19, wherein the control information scheduling the multiple transmission or reception occasions provides at least one parameter that is based on the condition.

28. The apparatus of claim 19, wherein the control information further indicates a pattern of resources over time, wherein the pattern indicates the resources for each occasion of a set of the multiple transmission or reception occasions.

29. The apparatus of claim 28, wherein the pattern of resources is a pattern of increasing resources over time, wherein the increasing resources comprise increasing resources in at least one of the time domain or the frequency domain.

30. The apparatus of claim 19, wherein the at least one processor is further configured to perform the adaptation of the initial amount of resources by switching from a first resource configuration to a second resource configuration, wherein the second resource configuration is associated with a larger amount of resources than the first resource configuration.

* * * * *